United States Patent
Häußler et al.

(10) Patent No.: US 11,186,209 B2
(45) Date of Patent: Nov. 30, 2021

(54) CHILD SAFETY SEAT

(71) Applicant: BRITAX RÖMER KINDERSICHERHEIT GMBH, Leipheim (DE)

(72) Inventors: Bernd Häußler, Ulm (DE); Michael Fürstenberg, Ulm (DE)

(73) Assignee: BRITAX ROMER KINDERSICHERHEIT GMBH, Leipheim (DE)

( * ) Notice: Subject to any disclaimer, the term of this patent is extended or adjusted under 35 U.S.C. 154(b) by 63 days.

(21) Appl. No.: 16/718,749

(22) Filed: Dec. 18, 2019

(65) Prior Publication Data
US 2020/0198503 A1    Jun. 25, 2020

(30) Foreign Application Priority Data
Dec. 19, 2018    (EP) .................................... 18214086

(51) Int. Cl.
*B60N 2/28*    (2006.01)

(52) U.S. Cl.
CPC ......... *B60N 2/2866* (2013.01); *B60N 2/2812* (2013.01); *B60N 2002/2818* (2013.01)

(58) Field of Classification Search
None
See application file for complete search history.

(56) References Cited

U.S. PATENT DOCUMENTS

| | | | | |
|---|---|---|---|---|
| 7,823,974 B2 * | 11/2010 | Mendenhall | ......... | B60N 2/2872 297/255 |
| 2008/0224512 A1 * | 9/2008 | Mendenhall | ......... | B60N 2/2866 297/250.1 |
| 2012/0292965 A1 * | 11/2012 | Sedlack | ............... | B60N 2/2812 297/256.16 |
| 2018/0079329 A1 * | 3/2018 | Theander | ............... | B60N 2/286 |

FOREIGN PATENT DOCUMENTS

| | | | | |
|---|---|---|---|---|
| CA | 2518222 C | * | 5/2009 | .......... B60N 2/2851 |
| CN | 111873870 A | * | 11/2020 | |

* cited by examiner

*Primary Examiner* — David E Allred
(74) *Attorney, Agent, or Firm* — K&L Gates LLP

(57) ABSTRACT

The invention relates to a child safety seat (100) comprising a seat base (102) and a seat back (104), the child safety seat (100) being convertible between a backless booster configuration and a highback booster configuration, in the backless booster configuration a first side (106) of the seat back (104) providing the sitting area (114) of the seat and a second side (108) of the seat back (104) being opposite to the seat base (102), the first side (106) being opposite to the second side (108), in the highback booster configuration the seat base (102) providing the sitting area (114) of the seat and the second side of the seat back (104) providing a back rest of the seat.

26 Claims, 9 Drawing Sheets

CHILD SAFETY SEAT

Figure 1A:
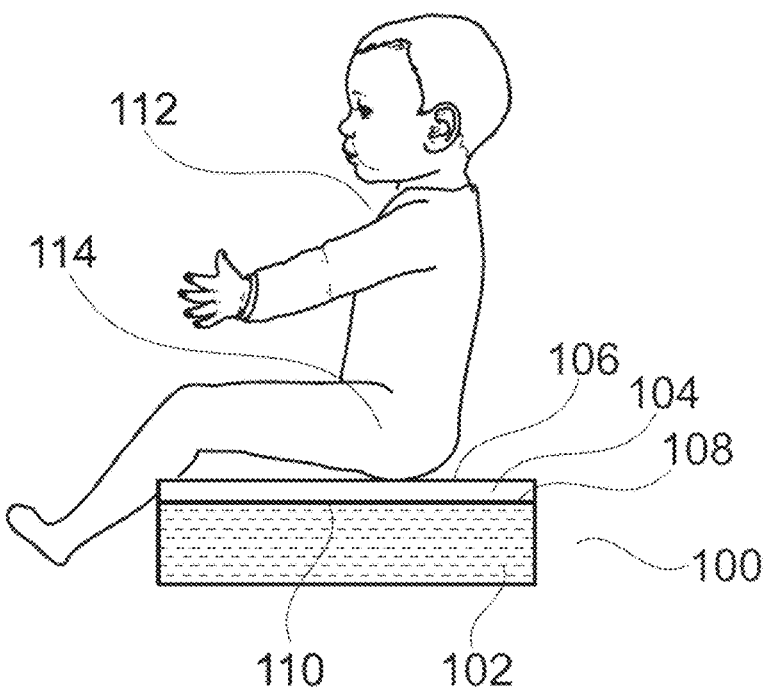

Disclosed is a child safety seat comprising a seat base and a seat back, the child safety seat being convertible between a backless booster configuration and a highback booster configuration.

Depending on the weight and age or size of children, different kinds of child safety seats are recommended to secure a child in a vehicle. For smaller children, child safety seats that hold the infant by means of a harness are recommended. For taller children that are not yet tall enough to properly use a vehicle seatbelt, booster seats are recommended that lift the children and allow the seatbelt to fit firmly across the collarbone and chest, with a lap portion fitted to the hips. Boosters can be distinguished between two types, namely a highback booster and a backless booster. Highback boosters provide improved head protection since the head and chest of the children are additionally secured by means of a seat back. On the other hand, backless boosters are more compact and can therefore be handled more easily.

U.S. Pat. No. 4,643,474 discloses a child's car booster seat that works with the automobile's existing safety belt restraint system. A highback booster seat is known, for example, from US 20170151894 A1.

SUMMARY

Disclosed is a child safety seat comprising a seat base and a seat back, the child safety seat being convertible between a backless booster configuration and a highback booster configuration. In the backless booster configuration, the first side of the seat back provides the sitting area of the seat, and the second side of the seat back and the seat base are opposing each other. The first side is opposite to the second side. In the highback booster configuration, the seat base provides the sitting area of the seat, and the second side of the seat back provides a backrest for the seat.

The "sitting area" is generally understood as the area where the child is sitting with his buttocks on the seat when the child seat is used in a predetermined manner, i.e., either in the backless booster configuration or in the highback booster configuration. It may be provided that the sitting area is ergonomically shaped to accommodate a child's buttock and thighs. A child sitting in the sitting area can be secured in the vehicle by using the vehicle's three-point seatbelt. Thus, the sitting area in the backless booster configuration and the highback booster configuration is the area for which a "partial restraint" is provided, in which an adult seatbelt passes around the body of the child and thus in combination with the backless booster or highback booster forms a complete child restraint system in accordance with the United Nations Regulation R129, for the approval of Enhanced Child Restraint System (ECRS).

Embodiments may have the benefit that due to the convertibility of the child safety seat between the backless booster configuration and the highback booster configuration, a universal child safety seat can be provided that, in the backless booster configuration, is easy to handle and transport due to its compact size. This means that in the backless booster configuration, the child safety seat may be quickly moved between different cars or other vehicles like busses or planes. In the backless booster configuration the child safety seat may have outer dimensions that permit to treat the seat as hand baggage in a plane. For this purpose, it could be advantageously provided that the child safety seat has a carrying handle, the carrying handle may be on the seat base. It may further be provided that the carrying handle may be flush with the surface of the seat base when not needed and may be pulled out or pushed out of the seat base surface when needed. Generally, the seat can be easily carried or stored anywhere in the backless booster configuration. On the other hand, when being used in the highback booster configuration, the child safety seat may provide improved safety for a child sitting in the sitting area due to additional protection of the head and chest region of the child by means of the seat back. The seat back may generally include a headrest, which may be beneficial for damping lateral impact to the head, and optional side wings that may provide for damping of lateral impact to the child's chest.

In accordance with an embodiment, the child safety seat further comprises a joint connecting the seat base to the seat back, the child safety seat being convertible between the backless booster configuration and the highback booster configuration by a tilting movement of the seat back guided by the joint. The joint may ensure that the seat back and the seat base are always connected to each other; therefore, at any point, a user of the child safety seat is able to convert the seat from the backless booster configuration to the highback booster configuration in a guided manner. Thus, there is no need for a disassembly of the seat for changing from the highback booster configuration to the backless booster configuration. For the backless booster configuration there is further no need to store the seat back somewhere else for later retrieval and usage in the highback booster configuration.

For example, the seat base and the seat back are non-detachably fixed to each other by the joint.

In accordance with an embodiment, the child safety seat further contains a lap belt guide. In both the backless booster configuration and the highback booster configuration, the lap belt guide protrudes beyond the seating surface of the respective sitting area.

The purpose of the lap belt guide is to positively guide the lap strap to ensure that the loads transmitted by the lap strap are transmitted through the pelvis of the child. "Lap strap" means a strap that passes across the front of and restrains the child's pelvic region (UN Regulation 129).

Thus, instead of using one special lap belt guide for the backless booster configuration and another special lap belt guide for the highback booster configuration, the provision of a lap belt guide that can be used in both configurations may be beneficial due to the reduced number of parts of the child safety seat and therefore the reduced weight of the seat. Nevertheless, in both configurations, the lap belt guide can be used in the same intended way and manner, i.e., to positively guide the lap belt or lap strap to ensure that the loads transmitted by the lap belt are transmitted through the pelvis of a child sitting in the seat.

In accordance with an embodiment, the lap belt guide is arranged or fixed on the seat base.

In accordance with an embodiment, the seating surface forming the sitting area of the seat base comprises a first seating portion and a second seating portion in the form of a seat extension. The seat extension has a retracted position that may be used in the backless booster configuration and an expanded position that may be used in the highback booster configuration, wherein the seating surface of the seat base is larger in the extended position than in the retracted position. This may be beneficial because in the highback booster configuration, the legs of a child sitting in the seat are comfortably supported due to the larger surface. On the other hand, due to the retracted position more space is available in the backless booster configuration for components located on the second side of the seat back, such as a headrest and side wings, which, in this configuration, may be placed next to the extension. Therefore, the seat back and optional appliances of the seat back, such as a headrest and side wings, can be designed to be bigger, thus providing improved protection for a child in the highback booster configuration while nevertheless keeping the size of the child safety seat rather compact in the backless booster configuration.

It has to be noted that there may be various extended positions which are variable and which can be adjusted in accordance with the age or size of a child.

In accordance with an embodiment, the seat extension is transferable between the retracted position and the extended position by partially pulling the first seating portion and the second seating portion by a translational motion apart from each other.

For example, the first seating portion and the second seating portion comprise comb-shaped interlocking ribs, the translational motion comprising moving the ribs apart from each other. The usage of interlocking ribs may have the benefit that a mutual laterally mechanical stabilization is provided between the first and second seating portion.

Generally, a stretchy textile cover may be used that covers the seating surface and thus covers the open portion, e.g. the open ribs when the seat extension is in the extended position.

For example, the seat extension can be changed between the retracted position and the extended position by rotation around a seat extension axis, which is located in the seat base. The seat extension is, for example, eccentrically mounted on the seat extension axis. This could maximize the available range of motion of the seat extension between the retracted and extended positions.

In accordance with an embodiment, the seat base comprises a supporting surface that may be used for supporting and positioning the seat on a vehicle seat. Thus, the purpose of the supporting surface is to provide a contact surface with the vehicle seat, enabling use of the child safety seat in either the backless booster configuration or the highback booster configuration.

The supporting surface and the seating surface of the seating area of the seat base are opposite to each other, which holds true for both the backless booster configuration and the highback booster configuration. Further, the seat extension axis is spaced apart from the supporting surface at a distance smaller than one-third of the distance between the supporting surface and the seating surface of the seat base. For example, the seat extension axis is spaced apart from the supporting surface at a distance smaller than one-third, preferably smaller than one-fourth or one-fifth of the distance between the supporting surface and the seating surface that is provided by the seat base in the highback booster configuration. Generally, the seat extension axis should be placed as far down and forward as possible in the seat base in order to be able to rotate the seat extension as far forward as possible with a given axis of rotation.

In accordance with an embodiment, in the highback booster configuration, the seat back extends from a rear section of the seat base, wherein the seat extension is located in the front section of the seat base, i.e. opposite to the rear section.

In accordance with an embodiment, in the backless booster configuration, the seat base narrows toward the front and the seat extension is located in the narrowing section. Use of the narrowing section of the seat base may be beneficial since the space saved compared with a rectangular shape can be used in the backless booster configuration to accommodate appliances of the seat back, such as a part of the side wings that may have a bent inner surface to accommodate a child's shoulder in the highback booster configuration. Again, use of the narrowing section of the seat base may permit a rather compact child safety seat. By locating the seat extension axis in the narrowing section, the above-described principle can be fulfilled again, according to which the rotation axis may be placed as far forward as possible in the seat base.

In accordance with an embodiment, the seat extension is comprising a sidewall, wherein the sidewall is comprising a cupholder, wherein in the extended position of the seat extension the cupholder is transferable between a retracted position and an extended position. For example, the cupholder is laterally retractable from the sidewall of the seat extension. Alternatively or additionally, the cupholder is rotatable out of the sidewall.

In the retracted position of the seat extension the cupholder is for example at least partially laterally covered by a side surface of the first seating portion. This may be beneficial in that a cupholder can be provided which nevertheless occupies additional lateral space of the seat when the seat is converted to the compact backless booster configuration.

In accordance with an embodiment, the seat base comprises a supporting surface opposite to the seating surface of the sitting area of the seat base, wherein in the retracted position the second portion is partially received in between the first portion and the supporting surface. This may be beneficial in that the interior of the seat base can be used as storage space for a part of the seat extension. Especially in combination with the eccentric mounting of the seat extension on the seat extension axis, this may help minimize the external dimensions of the seat base when the seat extension is in the retracted position and may help maximize the surface that can be additionally provided by means of the second portion in the extended position of the seat extension.

For the child safety seat, for which the seating surface forms the sitting area of the seat base and which comprises a first seating portion and a second seating portion in the form of a seat extension, wherein the seat extension has a retracted position that may be used in the backless booster configuration and an expanded position that may be used in the highback booster configuration, in accordance with an embodiment, the child safety seat is transferable between the backless booster configuration and the highback booster configuration by a rotation of the seat back relative to the seat base. The seat base and the seat back may be nondetachably rotatably fixed to each other by a joint. The child safety seat in accordance with this embodiment further comprises coupling means. The coupling means are adapted to transfer the rotation of the seat back occurring during the transfer between the backless booster configuration and the highback booster configuration into a translational displacement of the first seating portion. Further, the coupling means are adapted to transfer the rotation of the seat back occurring during the transfer between the backless booster configuration and the highback booster configuration into a transfer of the seat extension between the retracted position in the backless booster configuration and the extended position in the highback booster configuration. For this embodiment it is further envisaged that in the extended position the second seating portion may extend between the first seating portion and the second side of the seat back.

This child safety seat of this embodiment may thus enable a user to achieve with only one rotational movement of the seat back relative to the seat base to not only transfer the child safety seat between the backless booster configuration and the highback booster configuration, but at the same time also to realize the translational displacement of the first seating portion. Thus, it may be possible that while the child safety seat is transferred from the backless booster configuration to the highback booster configuration, at the same time the first seating portion is moved in the direction opposite to a joint rotatably connecting the seat base and the seat back. Thereby, at the same time the seat extension is transferred from the retracted position to the at least one extended position, such that the seating surface of the seat base is enlarged.

Of course, it may be also possible that while the child safety seat is transferred from the highback booster configuration to the backless booster configuration the first seating portion is moved simultaneously with this transfer in the direction to the joint rotatably connecting the seat base and the seat back. At the same time the seat extension may be transferred from the at least one extended position to the retracted position, such that the seating surface of the seat base is reduced.

In order to realize the transfer of the rotation of the seat back occurring during the transfer between the backless booster configuration and the highback booster configuration into a translational displacement of the first seating portion, the coupling means may comprise a first coupling portion rotatably mounted via a bearing to the seat back, wherein the first coupling portion comprises a slide guide in which a pin arranged on the first seating portion is guided. The usage of a slide guide may have the benefit that in a mechanically simple and thus robust manner a means is provided that forces the first seating portion to perform its translational displacement.

The bearing position may be a position spaced apart from the joint connecting the seat base and the seat back, in order to provide leverage between the seat back and the first coupling portion. The lever may minimize the effort required to operate the seat. Even if the individual parts are robust and coupled with each other via a solid first coupling portion, the seat may still be operated easily.

E.g., by a rotation of the seat back relative to the seat base from the backless booster configuration to the highback booster configuration the first coupling portion may be e.g. perimetrically moved (e.g. on a circular path) with the rotation of the seat back, while the pin arranged on the first seating portion and guided by the slide guide of the first coupling portion is moved away from the joint. As a consequence, the first seating portion may be moved away from the joint. Of course, it may be also possible that by a rotation of the seat back relative to the seat base from the highback booster configuration to the backless booster configuration the first coupling portion is e.g. perimetrically moved (e.g. on a circular path) with the rotation of the seat back, while the pin arranged on the first seating portion and guided by the slide guide of the first coupling portion is moved towards the joint. In the above example, the first seating portion is thus moved towards the joint. The circular motion could keep the dimensioning of the coupling mechanism geometrically small, while maximizing the translational path of the first seating portion.

The seat base may further comprise a supporting surface opposite to the seating surface of the sitting area of the seat base, wherein the first seating portion and/or the second seating portion are movably disposable relative to the supporting surface by means of an elastic element, e.g. a spring mechanism. The elastic element may be supported on its one side by the supporting surface. The elastic element may optionally be adapted to elastically support, e.g. spring-support, the translational displacement of the first seating portion and/or the transfer of the seat extension. The elastic mechanism may pull or push the first seating portion and/or the second seating portion in the direction opposite to a joint connecting the seat base and the seat back when the child safety seat is transferred from the backless booster configuration to the highback booster configuration. Thus, the transfer of the rotation of the seat back occurring during the transfer from the backless booster configuration to the highback booster configuration into a translational displacement of the first seating portion may be supported by the elastic mechanism. The translational movement of the first seat portion is thus supported by an elastic element, e.g. spring-supported, especially from the retracted position to the extended position. This could help a user of the seat in a particular way, since he normally has to fold the seat back away from the seat base against gravity, whereby the force required for the resulting additional movement of the first seat portion is minimized due to the support of the elastic element.

Due to the elastic element it may also be conceivable that the first seating portion is maintained in its position by the force of the elastic element. Since the elastic element is available anyway to support the translatory movement of the first seat portion, the additional usage of the elastic element for holding (maintaining) the first seat portion in its extended position would make it possible to dispense further fixing elements (that normally would be required to fix the first seat portion in its extended position). This could mean a weight saving with regard to the seat.

The first seating portion may have a position in the highback booster configuration, another position in the backless booster configuration, and other positions during the translational displacement of the first seating portion occurring during the transfer from the backless booster configuration to the highback booster configuration. Thus, the first seating portion may be disposed in the highback booster configuration opposite the supporting surface such that e.g. due to the translational displacement at least a portion of the first seating portion projects beyond the supporting surface, wherein the first seating portion may be disposed further away from the joint connecting the seat base and the seat back than in the backless booster configuration. It is also conceivable that the first seating portion in the backless booster configuration may be arranged opposite the supporting surface in such a way that the seating portion is arranged above the supporting surface and does not project beyond it, whereby the first seating portion may be arranged closer to the joint than in the highback booster configuration. According to where the spring mechanism is supported on the supporting surface and according to how the spring mechanism is configured, the first seating portion may thus be maintained in position.

For example, the (e.g. spring) force of the elastic element is acting in the direction of the translational displacement of the first seating portion occurring during the transfer from the backless booster configuration to the highback booster configuration. Preferably, the force is acting in between the first seating portion and the supporting surface in the direction of the translational displacement during the transfer from the backless booster configuration to the highback booster configuration.

In order to e.g. further support the transfer of the rotation of the seat back occurring during the transfer between the backless booster configuration and the highback booster configuration into a translational displacement of the first seating portion, the first coupling portion may be adapted for being rotated around the bearing and the slide guide may be adapted for pulling the pin towards the bearing when the seat back is rotated relative to seat base from the highback booster configuration to the backless booster configuration. The slide guide may be arranged in the first coupling portion in such a way that it is essentially horizontally arranged in the highback booster configuration. In case the first coupling portion is rotated around the bearing, the slide guide may therefore also be rotated, thereby pulling the pin of the first seating portion towards the bearing.

In order to e.g. further minimize the force required to transfer the rotation of the seat back occurring during the transfer between the backless booster configuration and the highback booster configuration into a translational displacement of the first seating portion, the first coupling portion may have a first stop and the seat back may have a second stop counterpart to the first stop. The first and the second stop may be adapted, due to a mutual contact, to rotate the first coupling element together with the seat back upon rotation of the seat back from the highback booster configuration into the backless booster configuration, the mutual contact resulting from said rotation of the seat back.

For example, the seat back and the first coupling element may form a lever in the state of contact between the first and second stop, wherein the bearing point may form the fulcrum of the lever.

It may further be envisioned that the coupling means comprises a second coupling portion, the second coupling portion being adapted to perform the transferring of the seat extension between the retracted position and the at least one extended position, the second coupling portion being coupled to the first seating portion or the first coupling portion. The second coupling portion may be further coupled to the first seating portion and the first coupling portion.

The second coupling portion may be coupled to the first seating portion and/or the first coupling portion such that if the first seating portion is translationally displaced during the transfer between the backless booster configuration and the highback booster configuration the seat extension is transferred between the retracted position and the at least one extended position. Thus, since the seat extension is coupled via the second coupling means with the first seating portion and/or the first coupling portion, it may be made possible that the seat extension may not have to be manually brought into the retracted position, e.g. before the seat back is rotated for the backless booster configuration, or manually brought into the at least one extended position, e.g. after the seat back is rotated for the highback booster configuration. This may simplify operation of the seat by a user.

In accordance with an embodiment, the seat back further comprises side wings optionally movable between a retracted position and an extended position, wherein in the extended position the vertical spacing between the backrest and the side wing is larger than in the retracted position. This may be beneficial in that in the backless booster configuration, the side wings may be positioned in the retracted position, thus consuming less space and ensuring compact external dimensions of the child safety seat. In contrast, in the highback booster configuration, the side wings may be moved to the extended position to provide optimal protection of a child's chest and head against the forces of a lateral impact. Instead of a movability of the side wings between the retracted position and an extended position the side wings may be rigidly fixed to the seat back.

In accordance with an embodiment, for each side wing in the extended position of the side wing the vertical spacing between the seating surface of the sitting area of the seat base and the side wing is smaller than in the retracted position of the side wing. In the extended position, the side wings are therefore more forward of the backrest and also moved downward in the direction of the seating surface. Additionally or alternatively it is possible that in the extended position the side wings are moved laterally, i.e. outwardly.

In accordance with an embodiment, the seat further comprises one or more elastic elements, the side wings being movable from their retracted position to their extended position by these elastic elements. For example, in the backless booster configuration, the side wings are lying together with the supporting surface of the seat base on the vehicle seat. This automatically presses the side wings against the force of the elastic element into the retracted position. Further, an optional locking mechanism may lock and fix the side wings after they are pressed into the retracted position. In the highback booster configuration, after an optional unlock of the side wings, no counterforce is acting on the side wings such that the force provided by one or more of the elastic elements is automatically pushing the side wings from their retracted position to their extended position. Again, it is also possible to lock the side wings in the retracted position and to provide a release mechanism, which releases the side wings such that they are then pushed by the force of the elastic elements into the extended position. The release may be realized by a manual operation, for example, via a certain handle or push button, or it may be triggered by a mechanism that is activated upon rotation of the seat back around the joint connecting the seat base to the seat back.

In accordance with an embodiment, the child safety seat further comprises a shoulder belt guide having a side facing away from the seating space confined by the side wings, wherein in the retracted position of the side wings, the side of the shoulder belt guide that is facing away from the seating space (or the place where the child's chest is to be accommodated) is laterally covered by one of the side wings, at least partially. The purpose of the shoulder belt guide is to position the part of the belt that restrains the child's upper torso in a way that ensures optimal restraint of the torso.

Laterally covering the shoulder belt guide in the retracted position may be beneficial in avoiding any confusion on installation of the child safety seat in the backless booster configuration. In the backless booster configuration, the only operable belt guide that is available is the lap belt guide, since either the shoulder belt guide is not accessible or visible at all, or it is only partially visible but not accessible to the user. Thus, safe installation and operation of the child safety seat may be ensured.

For example, in the retracted position of the side wings, the shoulder belt guide is at least partially or e.g. even fully received in one of the side wings or the seat back.

In accordance with an embodiment, for each side wing in the retracted position, a portion of the side wing is laterally spaced from the seat back by a gap, wherein the lap belt guide is adapted for protruding through the gap beyond the first side of the seat back in the backless booster configuration. This may be beneficial in that in a constructionally simple manner, the lap belt guide is available for use both in the backless booster configuration and the highback booster configuration.

In accordance with an embodiment, the lateral portion of the seat base is comprising a side surface. For example, the seat base is comprising a supporting surface opposite to the seating surface of the sitting area of the seat base, wherein the seating surface and the supporting surface are connected to each other by a side surface. For example, the side wings are adapted for resting on part of said side surface in the backless booster configuration.

In accordance with an embodiment, the seat back is adapted for extending from a rear section of the seat base in the highback booster configuration, wherein the seat back is comprising a headrest movable between at least one extended position and the retracted position, wherein in the extended position of the backrest the vertical spacing between the seating surface of the sitting area of the seat base and the headrest is larger than in the retracted position.

This may be beneficial in that the position of the headrest can be adapted to the size of the child to be accommodated in the child safety seat. The retracted position of the headrest may be used, for example, in the backless booster configuration, since this also ensures that the external dimensions of the child safety seat are kept minimal.

For example, the movability of the side wings between their extended and retracted positions is independent from the movability of the headrest between its extended and retracted positions.

In accordance with an embodiment, the side wings are fixed to the headrest. In other words, the side wings can be vertically moved with a vertical movement of the headrest itself between at least one extended position and the retracted position of the headrest. Independent therefrom, as discussed above, for each side wing in the extended position, the vertical spacing between the seating surface of the sitting area of the seat base and the side wing may be smaller than in the retracted position. This may be especially beneficial for larger children since the shoulder height does not increase linearly with the height of the head. Due to the adjustability of the height of the side wings relative to the headrest, it may be possible to take the anatomical shape of children of different ages into account and thus provide a child safety seat with maximum comfort and safety.

In accordance with an embodiment, the child safety seat further comprises a fixation means and a control element for controlling the fixation means and fixing the headrest in at least one extended position and the retracted position. For example, the fixation means comprise a latching mechanism for releasably fixing the headrest in the respective position.

In accordance with an embodiment, the child safety seat further comprises a safety belt clip, the safety belt clip comprising a positioning component and a guiding element, the positioning component being coupled to the seat base and the guiding element being adapted to engage with a lap portion of a safety belt, the seat base comprising a storage space below the seating surface forming the sitting area of the seat base the storage space being adapted for completely receiving the safety belt clip in the backless booster configuration, the positioning component being adapted to position the guiding element at a predefined distance from the respective seating surface of the sitting area in the highback booster configuration, the guiding element being adapted for limiting a movability of the lap portion of the safety belt in a direction vertical to the respective seating surface of the sitting area.

This may have a beneficial effect in that the guiding element can drive the lap portion of the safety belt toward the pelvic region of a child seated in the seat, such that the lap portion of the safety belt is always positioned well below the occupant's abdomen. This may avoid the occupant's pelvis sliding beneath the lap portion of the safety belt, reducing the risk that the lap portion of the safety belt intrudes into the abdominal region.

Generally, a safety belt clip is known in the prior art; for example, in EP 3031664 A1, which is included herewith in its entirety by reference.

By providing the possibility to store the safety belt clip in the storage space in the backless booster configuration, the compactness of the child safety seat is ensured. Upon "switching" the seat to an even more safe variant, i.e. the highback booster configuration, where compactness does not play a superordinate role, the safety belt clip can be additionally retrieved from the storage space and used.

In accordance with an embodiment, the child safety seat further comprises a safety belt clip, the safety belt clip comprising a positioning component and a guiding element; the positioning component is coupled to the seat base, and the guiding element is adapted to engage with the lap portion of a safety belt. The positioning component is adapted to position the guiding element at a first distance from the respective seating surface of the sitting area in the backless booster configuration and to position the guiding element at a second distance from the respective seating surface of the sitting area in the highback booster configuration. The seat back comprising a recess, the positioning component being adapted for protruding in the backless booster configuration through the recess beyond the seating surface of the sitting area provided by the seat back, and the guiding element being adapted for limiting movability of the lap belt portion of the safety belt in a direction vertical to the respective seating surface of the sitting area, i.e., in a direction facing the child and thus in a direction pointing away from the supporting surface of the seat.

Since the seat back contains a recess in the described embodiment and the positioning component is adapted for protruding in the backless booster configuration through the recess beyond the seating surface of the sitting area provided by the seat back, it is possible to provide the above-described additional safety for a child in the seat, both in the backless booster configuration and the highback booster configuration, with a single safety belt clip.

For example, the guiding element is arranged centered to the width of the seat base.

In accordance with an embodiment, the positioning component is adjustable in length such that the first distance corresponds to the second distance. For example, the seat base comprises a supporting surface opposite to the seating surface of the sitting area of the seat base; the positioning component, comprising a ribbon being passed through an opening in the seat base to the supporting surface; and the supporting surface, comprising a first fixation means for fixing the ribbon to the seat base in the backless booster configuration and a second fixation means for fixing the ribbon to the seat base in the highback booster configuration, wherein the location of the first and second fixation means is selected such that the engaging element is positioned at the first distance in the backless booster configuration and at the second distance in the highback booster configuration. Through use of the first and second fixation means, it may be possible to predefine the length of the ribbon and therefore the vertical position of the guiding element. Therefore, the above-described additional safety for a child occupying the seat can be guaranteed in an optimal manner for both the backless booster configuration and the highback booster configuration.

For example, the guiding element comprises a stop for the lap portion of the safety belt that is directed to the seat surface.

In accordance with an embodiment, the seat base further comprises a connecting mechanism, the connecting mechanism comprising an anchor element adapted for detachably anchoring the seat base to a vehicle or a seat of the vehicle in a functioning position of the anchor element. Further the connection mechanism comprises a guide rail, the anchor element being attached to the guide rail such that the anchor element can be pivoted between the functioning position and the resting position, wherein in the resting position the anchor element is received in the guide rail. The guide rail is, for example, adjustable in length, and the seat base is adapted to completely receive the anchor element in the resting position.

This may be beneficial in that on one hand, in the functioning position the child safety seat can be coupled to a structure of the vehicle in which the child safety seat is to be used. On the other hand, in case anchoring the seat base to the vehicle or the vehicle seat is not desired because, for example, the child safety seat is currently carried by a person or is just temporally moved to a vehicle for a quick transport of a child without anchoring the child safety seat, it is possible to have the connecting mechanism in the resting position such that it does not interfere with the use of the seat and limits the outside dimensions of the seat to a minimum size.

For example, the guide rail is a telescopic rail. In a further example, the telescopic rail comprises a first and a second rail engaging each other, wherein the first rail is fixed to the seat base and the anchor element is attached pivoted to the second rail, and wherein the second rail comprising a handle, and the handle and the first rail comprise multiple opposing latching elements. This may have the benefit that the anchoring of the seat base to the vehicle seat can be adjusted according to the shape of the vehicle seat on top of which the child safety seat is to be installed.

In accordance with an embodiment, the anchor element is pivoted to the guide rail by an axis, wherein the latching points of the latching elements are arranged in a plane parallel to the axis. This may be beneficial in that the lateral dimensions of the child safety seat are not increased by the latching elements and especially the handle. By this it may be possible to limit the maximum lateral dimensions of the connecting mechanism, including the handle, to the lateral dimensions of the guide rail. The grip of the handle may therefore be located at the distal end of the second rail, facing away from the first rail and being directed toward the seating surface, rather than laterally to the second rail in the direction of the axis.

In accordance with an embodiment, the handle is comprising a rotation knob, the rotation axis of the rotation knob corresponding to the rotation axis pivoting the anchor element to the second rail, wherein more particularly the rotation knob is adapted upon rotation around the axis for engaging and disengaging the opposing latching elements. For example, when the seat base has completely received the anchor element in the resting position, an engagement of the latching elements may prevent the anchor element from independently and unintentionally moving out of the resting position due to e.g. carrying of the seat by a person an acting gravity force.

The fact that the rotation axis of the rotation knob is corresponding to the rotation axis pivoting the anchor element to the second rail may be beneficial in that with a single hand of a user the latching elements can be disengaged, the first and the second rail can be extended relative to each other and the anchor element can be rotated relative to second rail. The latter is due to the fact that the rotation knob is arranged on the pivot point of the anchor element and the second rail. Upon releasing the rotation knob, e.g. by spring forces the knob automatically rotates back and the latching element are engaging again.

It has to be noted here that generally throughout the present disclosure, "laterally" is understood in accordance with the anatomy of the child to be accommodated in the child safety seat. A lateral direction therefore corresponds with the anatomical definition of lateral, which refers to the sides of a person and therefore a direction facing away from the center of the person to the side of the person.

It has to be further noted that the above-described embodiments and examples may be combined freely as long as the combinations are not mutually exclusive.

Figure 1B:
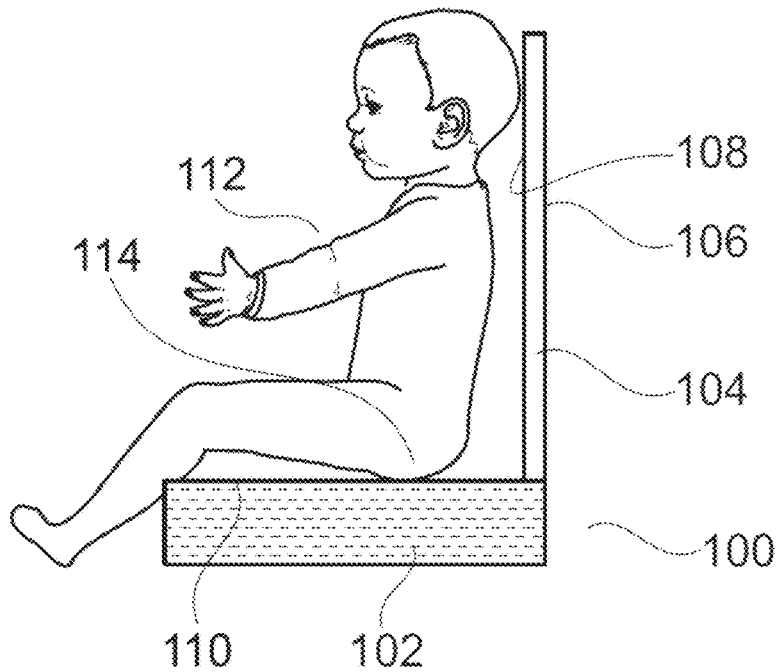
Figure 2:
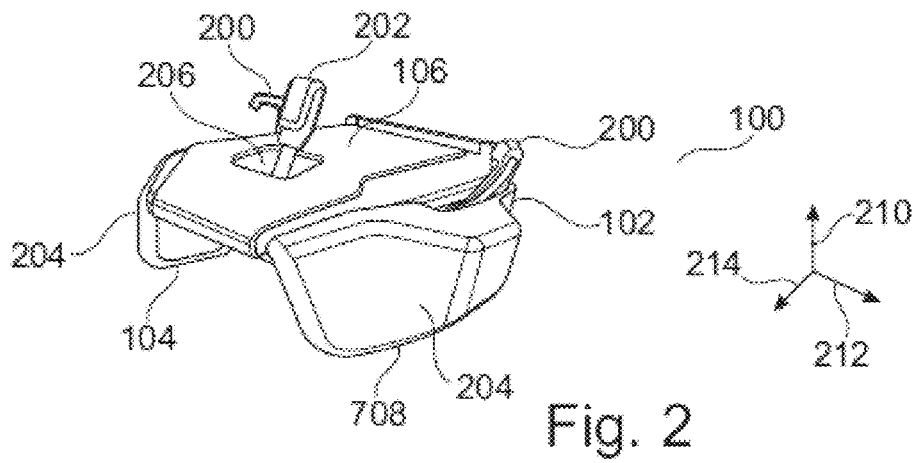
Figure 3:
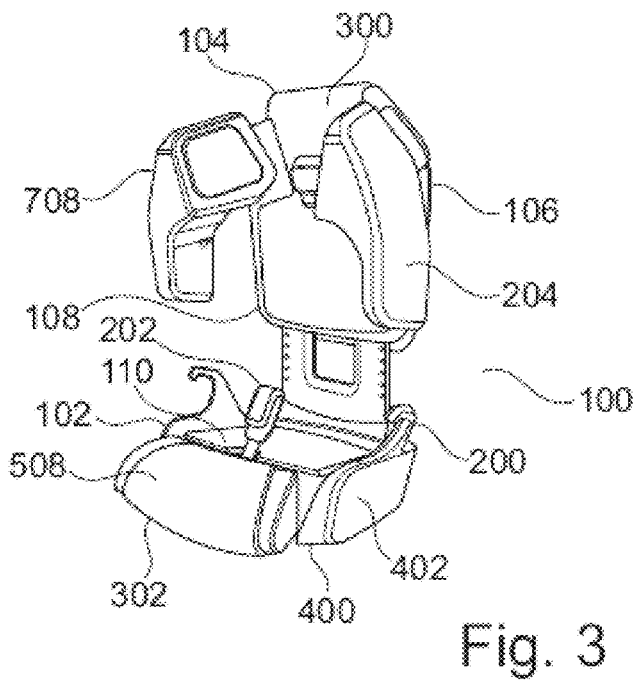
Figure 4:
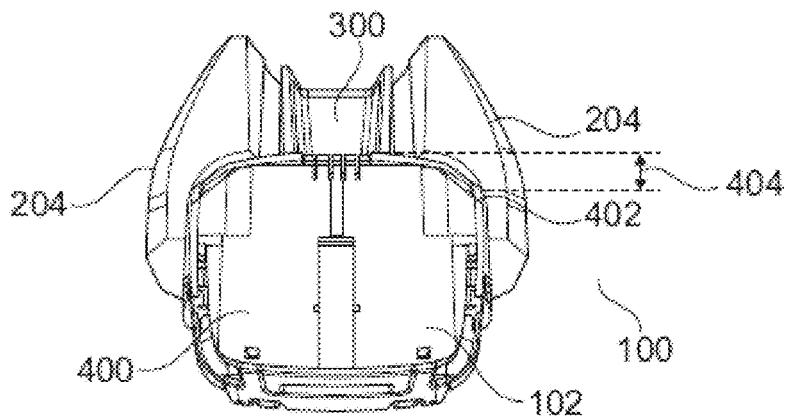
Figure 5:
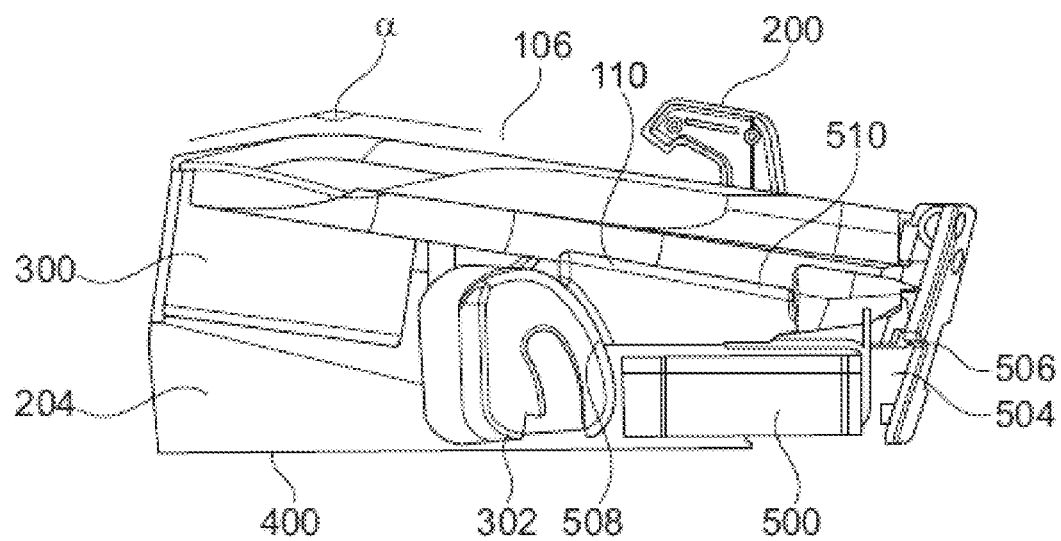
Figure 6:
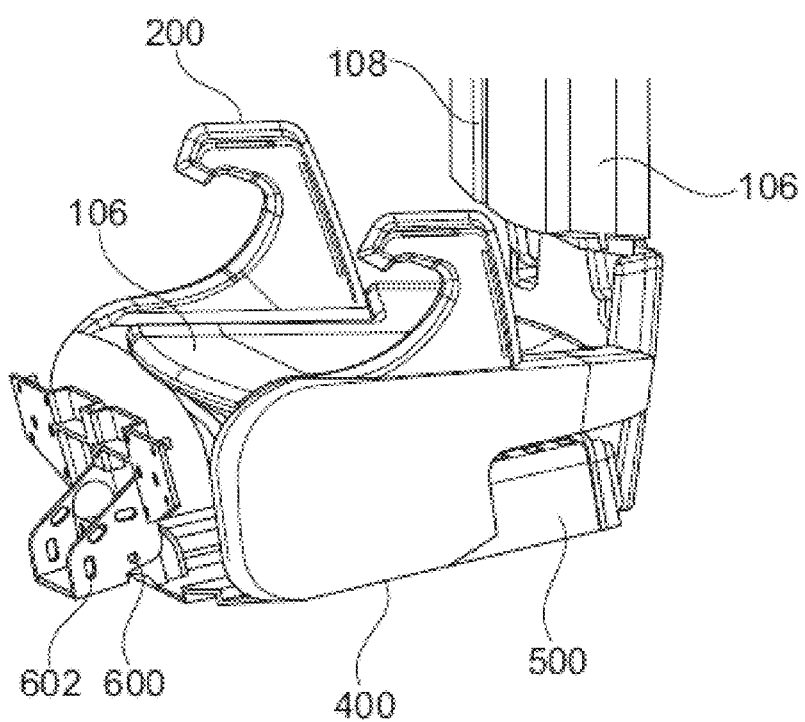
Figure 7:
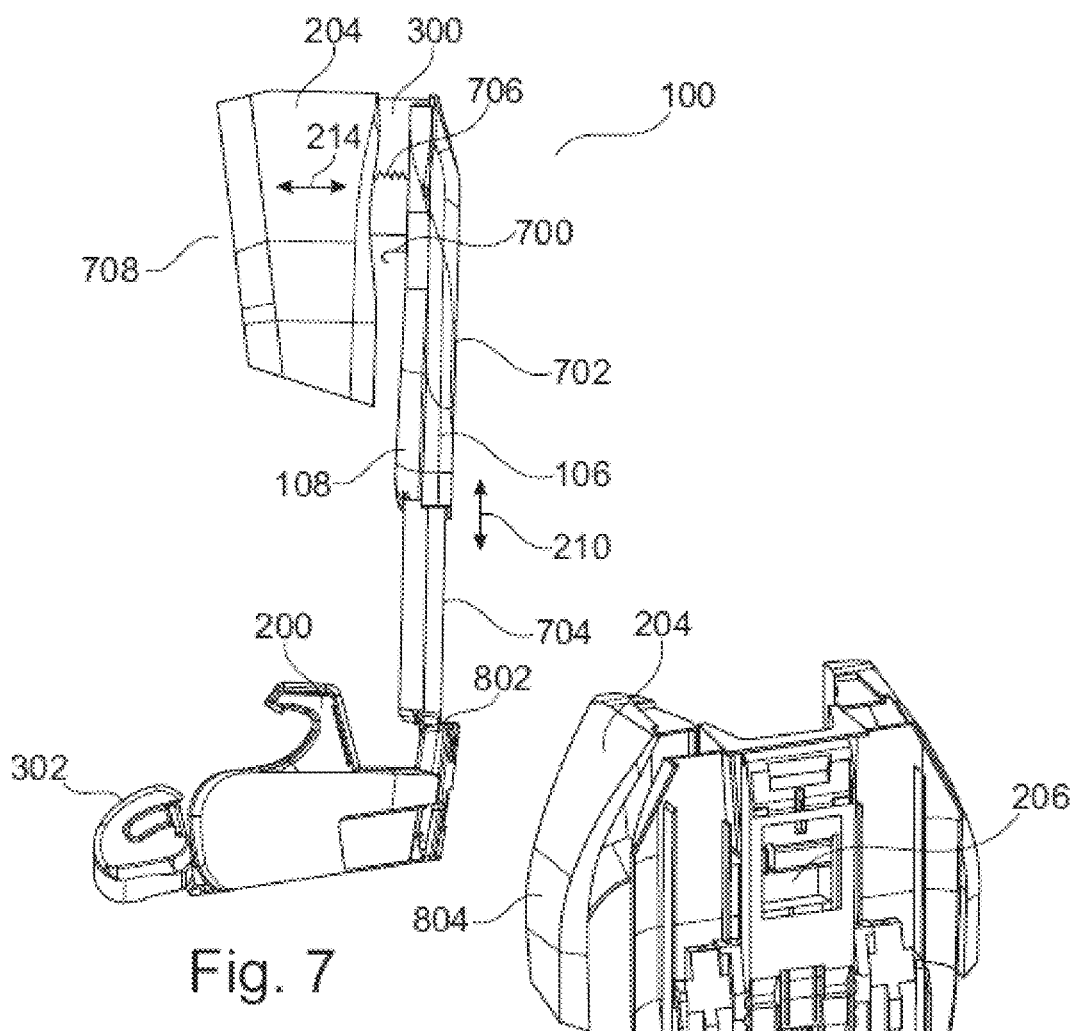
Figure 8:
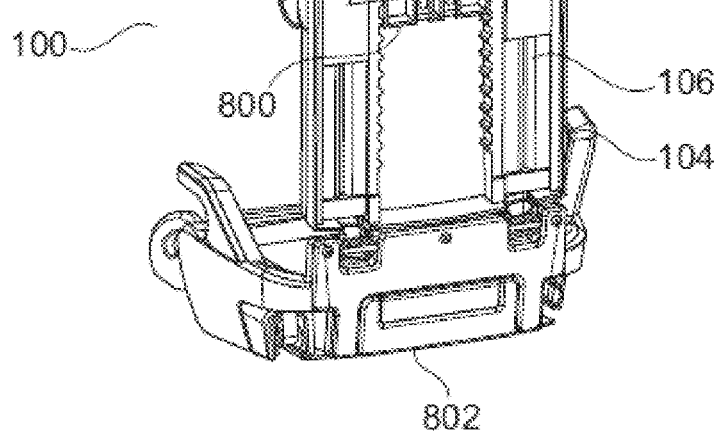
Figure 9:
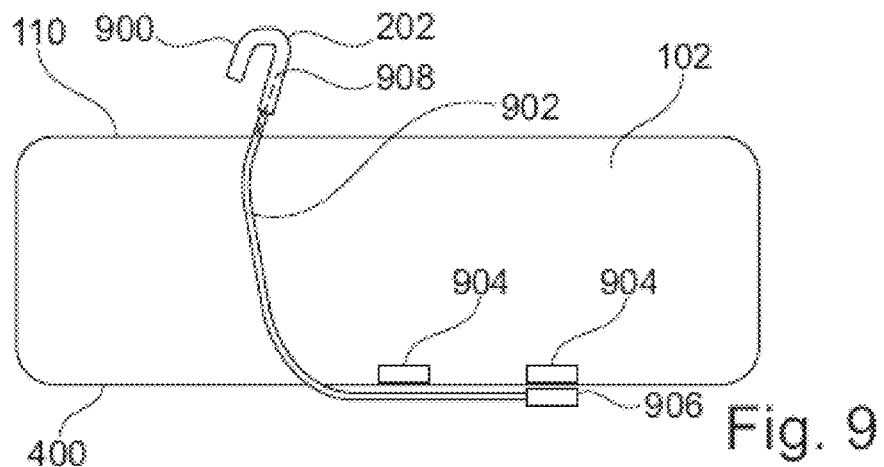
Figure 10:
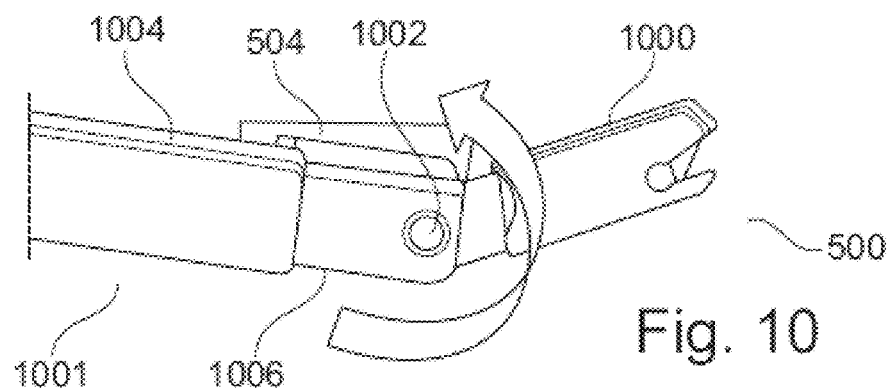
Figure 11:
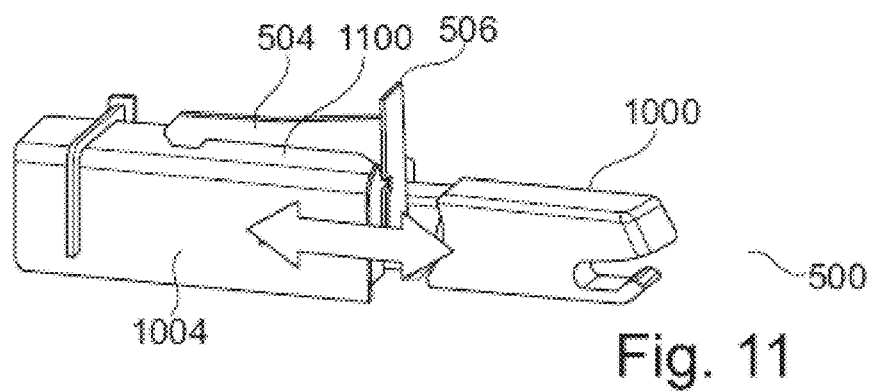
Figure 12:
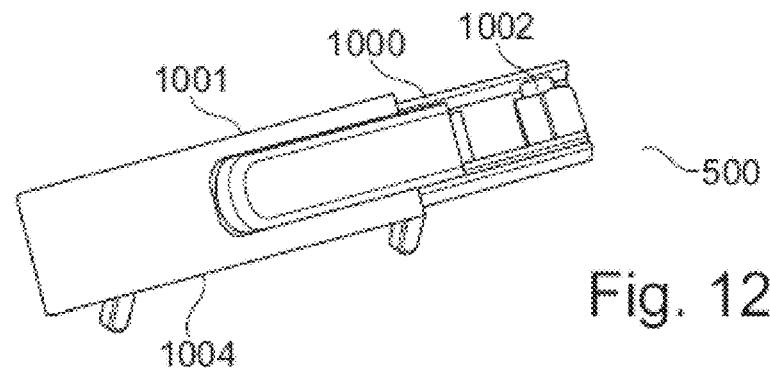
Figure 13:
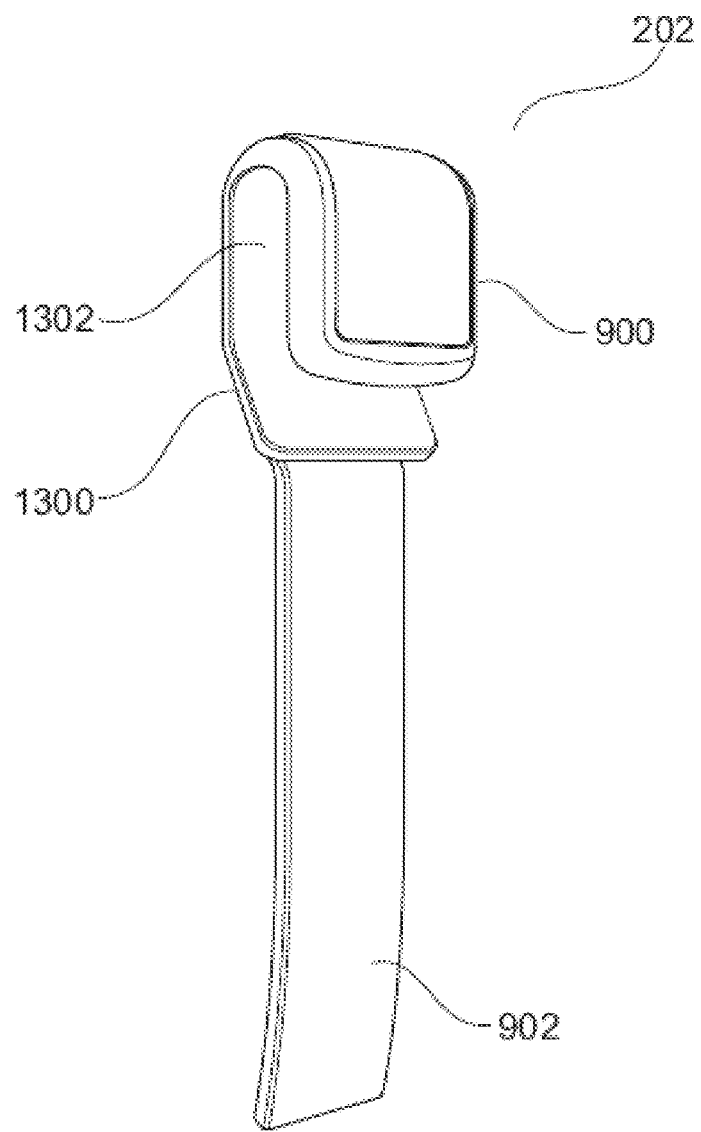
Figure 14:
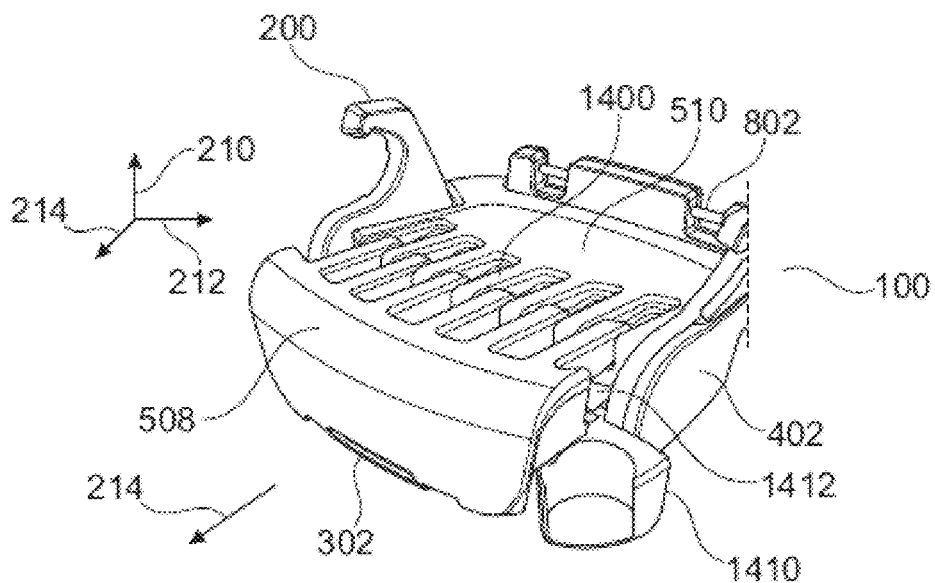
Figure 15:
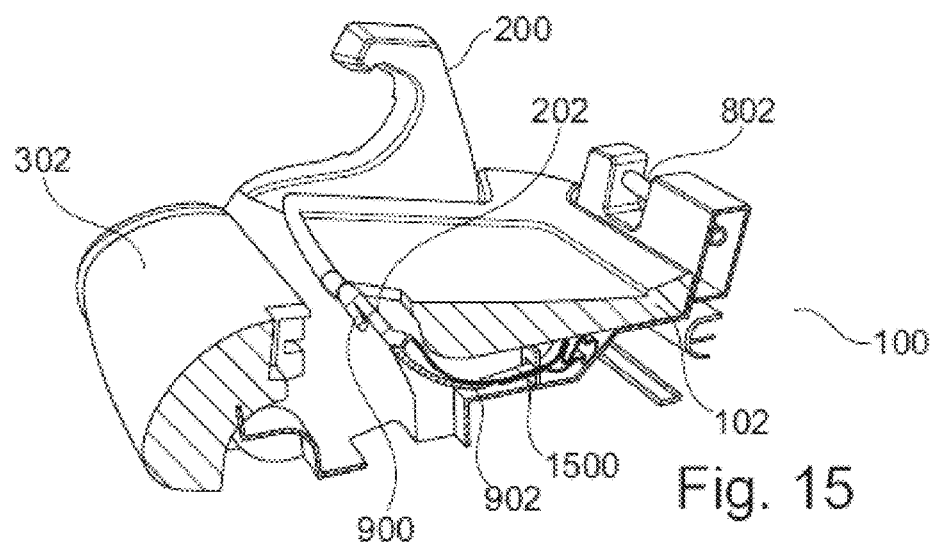
Figure 16:
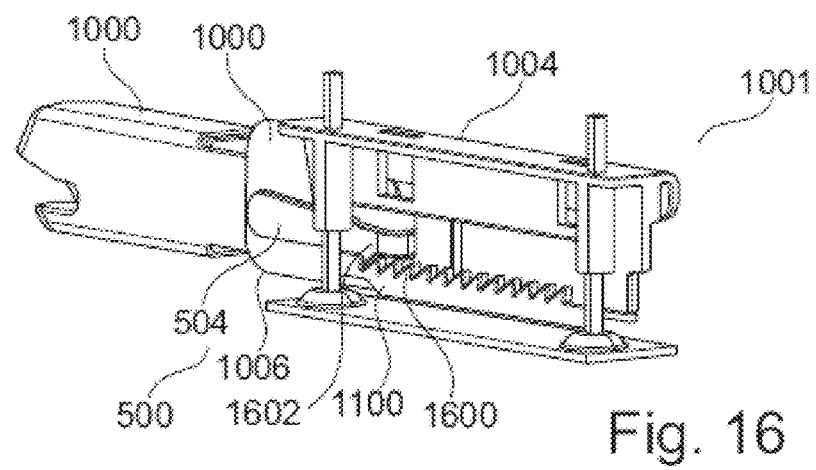
Figure 17:
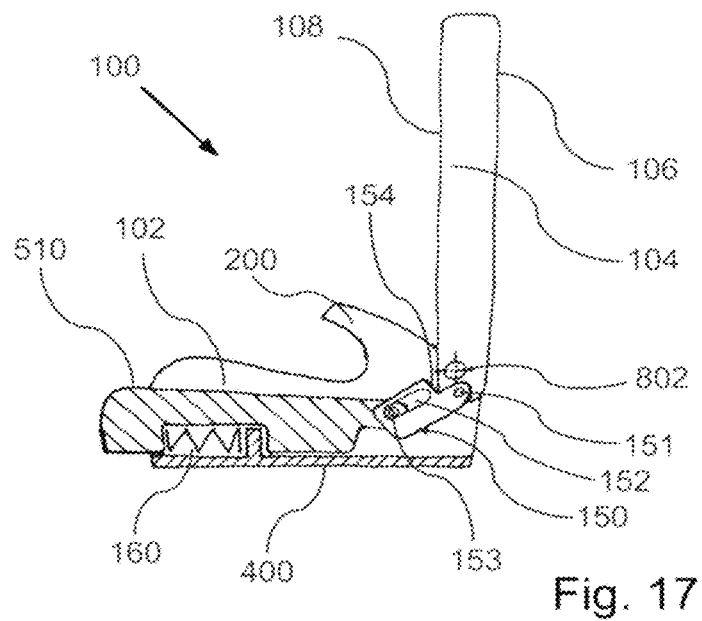
Figure 18:
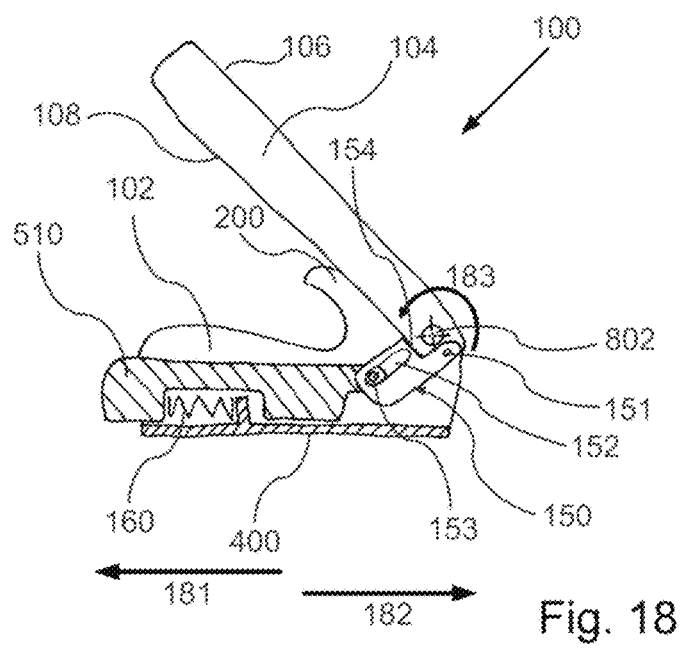
Figure 19:
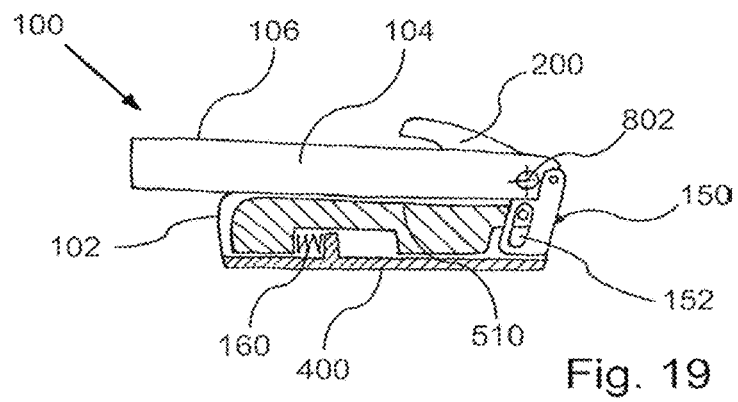
Figure 20:
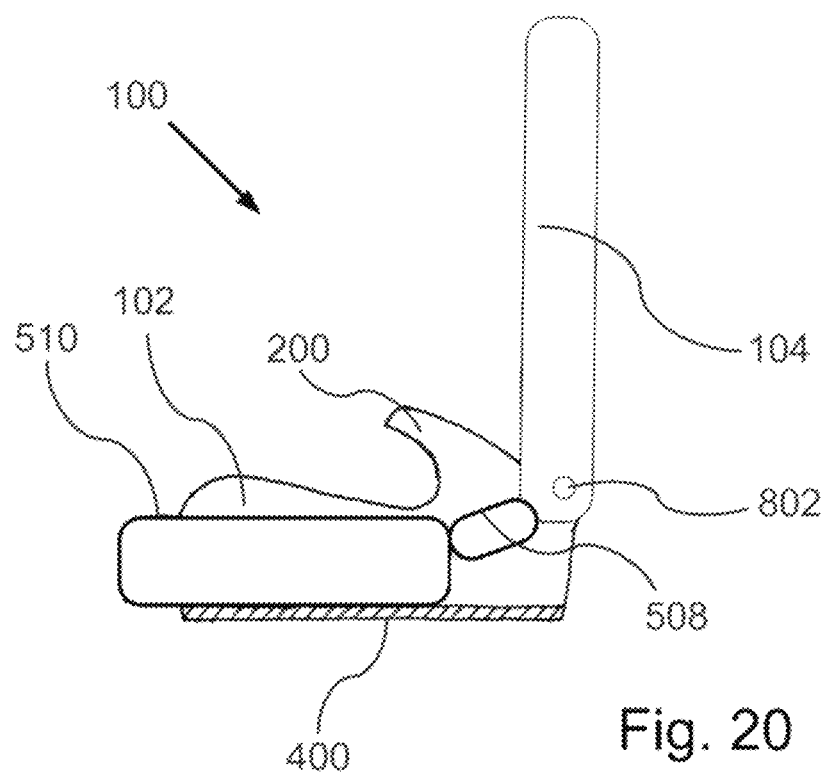
Figure 21:
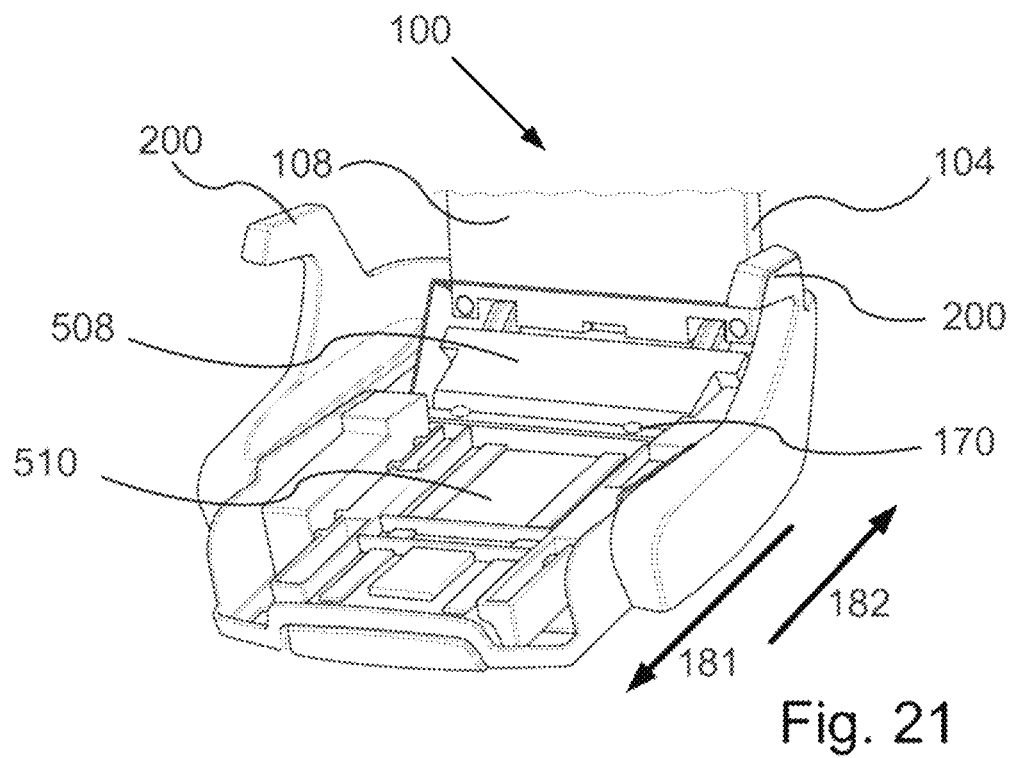

In the following, embodiments are described in greater detail by way of example only, making reference to the drawings in which:

FIGS. 1a and 1b show a schematic of a child safety seat in backless booster configuration and highback booster configuration, FIG. 2 illustrates a child safety seat in backless booster configuration, FIG. 3 illustrates a child safety seat in highback booster configuration, FIG. 4 illustrates a child safety seat in a bottom view and in the backless booster configuration, FIG. 5 shows a cross section through a child safety seat in backless booster configuration, FIG. 6 illustrates in more detail a seat extension of a child safety seat, FIG. 7 shows a child safety seat in a side view and in the highback booster configuration, FIG. 8 illustrates in more detail the inside of the seat back of the child safety seat, FIG. 9 illustrates the arrangement of a safety belt clip on a child safety seat, FIGS. 10, 11 and 12 illustrate a connecting mechanism of a child safety seat, FIG. 13 illustrates another view of a safety belt clip, FIG. 14 illustrates a seat extension of a child safety seat, FIG. 15 illustrates a child safety seat with a safety belt clip, FIG. 16 illustrate a connecting mechanism of a child safety seat, FIG. 17 shows a child safety seat in a side view and in the highback booster configuration, FIG. 18 shows a child safety seat in a side view and in a position between the highback booster configuration and the backless booster configuration, FIG. 19 shows a child safety seat in a side view and in a backless booster configuration, FIG. 20 shows a child safety seat in a lateral sectional view and in the highback booster configuration and FIG. 21 shows a child safety in a perspective view and in the highback booster configuration.

Following are similar elements denoted by the same reference numerals.

FIG. 1a is a schematic of a child safety seat comprising a seat base 102 and a seat back 104, the child safety seat 100 being convertible between a backless booster configuration and a highback booster configuration, wherein the backless booster configuration is the configuration as shown in FIG. 1a and the highback booster configuration is illustrated in FIG. 1b. In the backless booster configuration of FIG. 1a, the first side 106 of the seat back 104 is providing the sitting area 114 of the seat, and the second side 108 of the seat back 104 is opposite to the seat base 102, wherein the first side 106 is opposite to the second side 108. In the highback booster configuration of FIG. 1b, the seat base 102 is provided by a sitting surface 110 on the sitting area 114 of the seat, and the second side 108 of the seat back 104 is providing a backrest of the seat 100.

FIG. 2 shows a more detailed view of a child safety seat in backless booster configuration. In addition to FIG. 1a, FIG. 2 shows two lap belt guides 200 arranged on the left and right sides of the seat. The lap belt guides 200 have the purpose of guiding a lap belt portion of a three-point seatbelt in such a manner that the lap belt portion is securing the lower part of the torso of a child to the seat.

A safety belt clip 202 also guides the lap belt portion of the three-point belt around the lower part of the torso of the child to be accommodated in the seat such that "submarining" of the child is avoided, which means that a slip of the child below the lap belt portion is avoided. The safety belt clip 202 is located in the front portion of the seat 100, centered with respect to the width of the seat 100.

Also shown in FIG. 2 is the coordinates system of the seat, which illustrates the meaning of various terms. The lateral direction is, for example, given by the direction 212 corresponding to left and right of the seat when seen from a center point of the seat. The vertical direction is the direction 210, and the direction from the back to the front of the seat is given by direction 214.

FIG. 3 illustrates the child safety seat of FIG. 2 in the highback booster configuration. For example, starting from the backless booster configuration of FIG. 2, the seat back 104 is rotated around an axis into the upright position shown in FIG. 3. In the highback booster configuration, side wings 204, which are arranged laterally, i.e., to the left and right of the seat back 104, are available. Further, a headrest 300 of the seat back 104 is available. The side wings 204 are shaped in such a manner that the child's shoulders are sideways, i.e., protected against a lateral impact. Also, a part of the head region is protected by the side wings as well as the headrest.

In order to convert the child safety seat in between the backless booster configuration exemplarily depicted in FIG. 2 and the highback booster configuration exemplarily depicted in FIG. 3, a tilting movement of the seat back 106 guided by a joint connecting the seat back 106 to the seat base 102 may be used. A user may grip a handle located within the recess 206 thereby unlocking a mechanism that fixes the relative position of the seat back to the seat base in the respective configuration. When converting the seat from the backless booster configuration into the highback booster configuration, the user may press the handle within the recess towards the headrest 300, thereby unlocking said fixation mechanism and at the same time optionally operating a latching mechanism that is housed within the seat back. The latching mechanism allows the headrest to be extended and moved to a suitable position. When the seat back is positioned such that the highback booster configuration is taken, the handle may be released which locks the seat back in place relative to the seat base.

Further, optionally the operation of the handle or operation of the latching mechanism may further release a locking mechanism that locks the side wings 204 in place in their retracted position in the backless booster configuration. Upon releasing of said locking mechanism, the side wings 204 may e.g. move gravitationally from the retraced position into the extended position as the front sides of the side wing points at least partially downwards when the more or less horizontal seat back is tilted from the backless booster configuration into a more or less vertical position in the highback booster configuration. Optionally or additionally upon releasing of said locking mechanism, the side wings 204 may move driven by a force provided by an elastic element from the retraced position into the extended position, wherein the elastic element is coupling the side wings to the seat back.

The described type of design of the side wings 204 takes up a certain amount of space. Nevertheless, in the backless booster configuration, the side wings 204 and also the headrest 300 need to be arranged around the seat base 102.

This arrangement is shown in FIG. 4, which illustrates a bottom view of the child safety seat 100 in the backless booster configuration. Visible, for example, is the supporting surface 400 of the seat back 102, which is opposite to the seating surface 106 (backless booster configuration) and which permits support of the child safety seat on a vehicle seat. The seat base 102 has side surfaces 402, on which in the backless booster configuration the inner sides of the side wings 204 and a portion of the headrest 300 are resting. The headrest 300 in particular takes up a certain amount of space, and a part of the side of the seat back 102 that lies opposite to the headrest 300 serves in the backless booster configuration as part of the sitting surface 106 of the sitting area. Consequently, when the seat back is moved in the vertical direction, i.e., into the highback booster configuration, this part of the sitting area is "missing," and the front portion of the sitting surface 110 in direction 214 toward the front of the seat may become too short for comfortable seating.

For this reason, a seat extension 302 is provided, which is illustrated in FIG. 5 in a more detailed cross-sectional view. The seat extension 302 can be pivoted around an axis, which is shown in FIG. 6 as the axis 600. The extension 302 can be changed between a retracted position, shown in FIG. 5, and an extended position, shown in FIG. 6. In FIG. 6, the outer cladding of the seat extension is omitted for sake of simplicity, while in FIG. 3 the outer cladding is schematically shown.

In the state of the seat extension shown in FIG. 5, which corresponds to the state of the seat extension in the backless booster configuration, a surface portion 508 of the seat extension is located partially in between the seating surface 110 of the seat base 102 and the supporting surface 400. By a rotation of the surface portion 508 around the axis 600, the total available area for seating the child in the highback booster configuration is enlarged since now the surface area is provided by the portion 510 and additionally the portion 508. In order to maximize the available surface portion 508 in the extended position of the seat extension 302 while minimizing the space occupied by the seat extension in the retracted position, the axis 600 is mounted or located on the seat base 102 on the most frontward position of the seat base. Since the seat base 102 has a slightly rounded shape on its front side, as can be seen in FIG. 4, in order to provide sufficient space for the rounded side wings 204, in the backless booster configuration the width of the seat base narrows toward the front section, i.e., in direction 214 within a narrowing section of the seat base 102. The narrowing section is indicated in FIG. 4 with reference numeral 404.

Within this narrowing section, the axis 600 of the seat extension 302 is located on the most frontward point, which, in the example of FIG. 4, is the center portion (with respect to the width of the seat). Further, as can be seen in FIG. 6, the axis 600 is as close as possible to the supporting surface 400 of the seat base 102. Since the cladding of the seat extension 302 is rotatable eccentrically around the axis 600, a maximized portion of the surface 508 can be accommodated within the space in between the supporting surface 400 and the surface portion 510 of the seat base in the retracted position, while in the extended position, a rather large area of the surface portion 508 is available as part of the supporting surface 110 for use as a sitting area in the highback booster configuration.

Due to the rounded shape of the surface portion 508 of the seat extension 302, more than one single extended position of the seat extension may be realized. For example, for children with shorter legs it may be desirable to rotate the seat extension less than for larger children with longer legs, who require more leg support. For that purpose, latching elements 602 are provided (compare with FIG. 6) that permit the user to fix the seat extension after rotation in various different positions and therefore to releasably adjust the size of the surface portion 508. In general, the latching elements may permit the user to fix the seat extension at least in the retracted position and one extended position.

It has to be noted that along direction 214, the cross section of the respective seating surface of the child safety seat, both in the highback booster configuration and the backless booster configuration, has a shape with two legs showing an angle α of 20-35 degrees, preferably 24-30 degrees to each other. In the special example in FIG. 5, the seat 106 is initially set upward by +10 degrees relative to the surface 400, starting at the back and then moving downward by an angle α of −17 degrees. This provides a seat surface that can slightly tilt the child to be accommodated backward so that some of the forces in direction 214 acting during a strong braking operation of a vehicle carrying the seat 100 are transferred into the seat 100. The drop of the front part of the seat 106 toward the surface portion 508 serves to comfortably support the lower legs and calves of the child.

FIG. 7 shows a side view of a child safety seat in a highback booster configuration. Here the side wings 204, which are movable in direction 214 between a retracted position and an extended position, are visible. With respect to a given side wing, in the extended position the vertical spacing (in direction 214) between the backrest 106 and the side wing 204 is larger than in the retracted position.

One or more elastic elements 706, such as springs, may be provided by which the side wings 204 are pushed away from the backrest 108 of the seat. For example, the elastic elements 706 are dimensioned in strength in such a manner that when the child safety seat is converted from the highback booster configuration to the backless booster configuration and thereby pressed with the front side 708 of the side wings against the surface of a vehicle seat, the side wings 204 are pushed against the elastic force from their extended position to their retracted position. A latching mechanism that ensures that the side wings 204 are releasably fixable in the retracted position may additionally be provided.

Since the height of the headrest 300 is also adjustable in the vertical direction of the seat, i.e., in direction 210, the latching mechanism of the side wings 204 may be coupled to the mechanism (e.g., mechanism 800, compare with FIG. 8) that permits the movement of the headrest 300. For example, in the backless booster configuration, the backrest 300 will be in the lowest possible vertical position. When moving the headrest 300 out of this position, for example, by telescopically pulling apart backrest components 704 and 702, the latching mechanism of the side wings 204 may be released, and the elastic element 706 may then be able to move the side wings 204 from the retracted position to their extended position.

Besides the movement in direction 214 from the retracted position to the extended position, the side wings 204 are also adapted to additionally perform a downward movement in vertical direction 210 to the seating surface 110 of the seat base.

FIG. 8 shows a rear view of the seat 100 in which part of the interior of the seat back 104 is illustrated. This includes a latching mechanism 800 with various latching positions. By means of a handle 206, which, in the example of FIG. 8 is provided as a handle grip insert in the seat back 104, the interlocking of latching elements fixing the portion 702 in dedicated positions relative to the portion 704 of the seat back can be released and locked in place. Thus, the height of the headrest can be adjusted accordingly.

Further shown in FIG. 8 is a joint 802, e.g., an axis connecting the seat base 102 to the seat back 106. The child safety seat 100 is therefore convertible between the backless booster configuration and the highback booster configuration by a tilting movement of the seat back 106 guided by the joint 802. Besides a stiff axis, other variants of joints are possible, including joints that, besides a rotation of the seat back 106, permit, for example, a sliding of the seat back in direction 214 from the front to the back side of the seat when the seat back is moved in order to transition the seat from the backless booster configuration to the highback booster configuration.

In the rear view of FIG. 8, a space 804 is indicated between the outer side of the side wings 204 and their inner side, which is directed toward the child. Since the seat 100 has a shoulder belt guide 700, which is illustrated schematically in FIG. 7, it is possible that, in the retracted position of the side wings 204, this shoulder belt guide is received within the space 804. Therefore, in the retracted position the shoulder belt guide 700 is invisible from outside the seat. As a consequence, in the backless booster configuration the only available and visible belt guide is the lower belt guide 200, such that any confusion between the lower belt guide and the upper belt guide in the backless booster configuration is avoided. Instead of completely hiding the shoulder belt guide 700 in the retracted position of the shoulder belt guide 204, e.g., within the space 804, it is also possible to only partially cover the shoulder belt guide 700 such that the use of the shoulder belt guide 700 in the retracted position of the side wings 204 is impossible.

The handle that is used to operate the latching mechanism 800 is housed in a recess 206 of the seat back 104. When transitioning the child safety seat from the highback booster configuration to the backless booster configuration, the safety belt clip 202 may be moved through the opening or recess 206 such that in both configurations the safety belt clip 202 is available for securing the child in the child safety seat via the lap belt portion of the vehicle's safety belt. However, since the seat back 104 has a certain thickness, the distance of the safety belt clip 202 from the surface of the sitting area in the backless booster configuration does not correspond to the distance of the safety belt clip from the surface of the sitting area in the highback booster configuration.

In an example, the material of the side wings is expanded polypropylene (EPP), which is covered on the lateral side of the side wings with polypropylene (PP). The inner side of the side wings that is directed toward the child to be accommodated in the seat is free of PP, which may have the benefit that the relatively soft EPP serves as an energy absorber in case of a side impact.

FIG. 9 shows a schematic cross section of the seat base 102 and a safety belt clip 202, wherein the seat back is omitted for reasons of simplicity. The safety belt clip comprises a positioning component 902 and a guiding component 900, wherein the guiding component 900 is hook-shaped, pointing toward the respective seating surface, such as the seating surface 110. Optionally, a stiffening component 908 is provided that is supporting the guiding element in a predefined (for example, upright) position relative to the surface 110 in order to simplify the use of the safety belt clip 202, i.e., the threading of the lap portion of the safety belt into the hook.

The positioning component 902 comprises in the example of FIG. 9 a ribbon, which is passed through an opening in the seat base 102 to the supporting surface 400. Instead of a ribbon other variants are possible like for example a cord. The supporting surface 400 has two fixation means 904 spaced apart from each other by a certain distance in direction 214. However, it is also possible to have more than two fixation means, e. g. including a scale which indicates which fixation means to use depending on size of the child. The end portion of the ribbon 902 also has fixation means 906, which is adapted to interact with the fixation means 904 in order to affix the ribbon 902 tightly to the seat base 102. For example, the fixation means 904 and 906 form counterpart Velcro connections. Other possibilities are that the fixation means 904 and 906 provide possibilities for a mutual clipping of the means to each other to firmly attach the end of the ribbon 902 to the seat base 102.

In the example of FIG. 9, the left fixation means 904 is dedicated to the backless booster configuration, where the free end of the ribbon 902 has to be longer above the seat base 102 in order to be passed through the recess 206 such that the guiding element 900 is positioned at a predefined distance from the respective seating surface 106 of the seating area 140.

The right fixation means 904 is dedicated to the highback booster configuration, which requires a shorter available free end of the ribbon 902 such that the positioning component 900 is again located at, for example, the same distance from the seating surface, this time the seat surface 110 of the seating area 114.

FIGS. 10, 11 and 12 show various schematic views of a connecting mechanism 500 that can be used to anchor the seat 100 to a vehicle seat. For that purpose, the connecting mechanism comprises an anchor element 1000, which is adapted to be detachably connected to a vehicle or vehicle seat. In an example, the so-called Isofix connection may be used, which, on the side of the vehicle, consists of two retaining brackets that are located at a certain distance in a gap between the backrest of the vehicle seat and the vehicle seat surface. By means of the anchor element 1000, then, the child seat is hooked into these brackets.

The anchor element 1000 is pivoted to a guide rail 1001 such that the anchor element 1000 can be pivoted between a functioning position and a resting position, where in the resting position the anchor element 1000 is received in the guide rail 1001, as illustrated in FIG. 12. The functioning position is the position in which the anchor element can be used to anchor the seat base to the vehicle.

In order to adjust the distance of the child safety seat from the backrest of the vehicle seat onto which the child safety seat is to be positioned, the guide rail 1001 is adjustable in length. In the present example, this is achieved by using a telescopic guide rail that comprises a first rail 1004 and a second rail 1006 that are engaging each other. The first rail 1004 is fixed to the seat base, and the second rail 1006 has an axis 1002 by which the anchor element 1000 is pivoted to the second rail 1006.

In order to fix the distance of the axis 1002 from the first guide rail 1004 in a desired position, i.e., in order to fix the distance of the seat base 102 from the backrest of the vehicle seat on which the child safety seat 100 is to be installed, the second rail 1006 comprises a handle 504, wherein the handle 504 and the first rail 1000 comprise multiple opposing latching elements 1100. The handle 504 further comprises a protrusion 506 that is pointing towards the sitting area 114. In this manner, the handle is free of any protrusions in the lateral direction, i.e., in direction 212 such that the connecting mechanism does not necessarily increase the width of the seat base and additionally provides sufficient space on the lateral side of the seat base in order to accommodate the side wings 204.

While in FIG. 10 an example of the anchor element in the functioning position is shown, FIG. 11 shows the anchor element in a slightly different configuration in the functioning position, with the guide rail 1001 in a retracted configuration. In FIG. 12, the anchor element is received in the guide rail 1001, i.e., it is in the resting position. Further, this resting position of the anchor element may be characterized in the fully retracted state of the guide rail 1001.

In FIG. 11, the latching points of the latching elements 1100 are arranged consecutively, one behind each other in a plane parallel to the axis 1002. In the specific example of FIGS. 10-12, this plane is parallel to the supporting surface 400 and located in between the axis 1002 and the surface 110.

FIG. 13 shows a more detailed example of a safety belt clip 202. Again, the safety belt clip comprises a guiding element 900 and a positioning component 902, such as a ribbon. The guiding element 900 comprises a wide hook 1300 with laterally extending side regions 1302, with the distal end of the hook pointing toward the seating surface of the child safety seat, which, however, is not shown in FIG. 13.

The ribbon 902 is guided along the outer surface of the wide hook 1300 and fixed over its complete contact surface with the hook 1300. The side region 1302 of the hook 1300 is not covered by the ribbon 902, i.e., the ribbon 902 has a smaller width than the hook 1300. The latter may be beneficial in avoiding the left portion of the safety belt coming into direct contact with the ribbon 902 and causing any friction and therefore deterioration of the ribbon 902. The material of the hook 1300 could be, for example, a rigid plastic material that is typically not affected by any friction with the left portion of the safety belt during normal use.

The configuration of the safety belt clip 202 of FIG. 13 may be beneficial in that, on one hand, a highly stable fixation of the ribbon 902 to the guiding element 900 is provided, while, on the other hand, the resulting clip is rather compact and robust against deterioration due to frictional forces between the clip and a portion of the safety belt that is guided by the clip.

FIG. 14 shows another example of part of the child safety seat 100 with the seat back being omitted for simplicity reasons. Here, the first seating portion 510 and the second seating portion 508 comprise comb-shaped interlocking ribs 1400. The seat extension 302 forming the second seating portion 508 is therefore transferable between a retracted position and an extended position by partially pulling the ribs 1400 apart from each other in direction 214. Vice versa it is possible to move the first seating portion 510 and the second seating portion 510 together by pushing the seat extension in a direction opposed to 214. This results in the retracted position of the seat extension 302.

Further shown in FIG. 14 is a cupholder 1410 that is rotatable about an axis 1412 that points in direction 210. In FIG. 14 the cupholder 1410 is in its extended position in order to receive and hold cups or bottles. By rotating the cupholder 1410 around its axis 1412 it is possible to move the cupholder 1410 at least partially into the seat extension 302 into a retracted position. As a result, in the retracted position the seat extension 302 can be moved from the extended position shown in FIG. 14 into its retracted position. In the retracted position, the side surface 402 hides at least partially the cupholder 1410. This also means that in the retracted position of the seat extension 302 the cupholder 1410 cannot be moved into its extended position.

FIG. 15 shows a cross section through a seat 100 with the seat back being omitted for simplicity reasons. A safety belt clip 202 is depicted which comprises a guiding element 900 and a positioning component 902, such as a ribbon. The seat base 102 comprises a storage space 1500 that is adapted to completely receive the safety belt clip 202 in the backless booster configuration. For example, in case the seat is converted from the highback-booster configuration to the backless booster configuration, a user may move or "stuff" the safety belt clip 202 into the storage space 1500 such that the safety belt clip 202 is not an obstacle when the seat back is moved onto the seat base (conversion from highback-booster configuration to the backless booster configuration).

FIG. 16 is another example of a more detailed view of connecting mechanism 500 that can be used to anchor the seat 100 to a vehicle seat. For that purpose, the connecting mechanism comprises an anchor element 1000, which is adapted to be detachably connected to a vehicle or vehicle seat. In order to fix the distance of the axis 1002 (not visible in FIG. 16) and thus the anchor element 1000 from the first guide rail 1004 in a desired position, the second rail 1006 comprises a handle 504, wherein the handle 504 and the first rail 1004 comprise multiple opposing latching elements 1100. The latching elements 1100 are provided by a toothed rack 1600 fixed to the first guide rail 1004 and a locking pin 1602. The locking pin 1602 is movably arranged on the second rail 1006 via the handle 504, such that upon e.g. a rotational movement of the handle the locking pin 1602 and the toothed rack 1600 can be disengaged and the first rail 1004 can be freely moved relative to the second rail 1006. The handle 504 may comprise a spring element that forces the locking pin 1602 into the engagement position with the toothed rack 1600. The rotation or more general the movement of the handle 504 for disengaging the locking pin and the toothed rack may therefore be against the spring force of this spring element.

Generally, the handle 504 may comprise a protrusion 506 that is e.g. pointing towards the sitting area 114 (see example of FIG. 11) or that is laterally pointing away from the side of the seat. In the latter case the protrusion may be given by a rotation knob the, wherein the rotation axis of the rotation knob is corresponding to the rotation axis pivoting the anchor element 1000 to the second rail 1006.

E.g. in case of the protrusion 506 is pointing towards the sitting area 114, by pulling or pushing the protrusion 506, an end with the locking pin 1602 can transitioned in between the engagement and disengagement position with the toothed rack 1600. In case the protrusion 506 (i.e. the rotation knob) is laterally pointing away from the side of the seat (e.g. in direction 214), a rotation of the knob around its axis can be used for rotating the locking pin 1602 in between the engagement and disengagement position with the toothed rack 1600.

FIGS. 17 to 21 show another example of a child safety seat 100 with a seat extension 302, which is transferable between a retracted position and at least one extended position, whereby the seating surface of the seat base 102 is larger in the extended position than in the retracted position. The seating surface forming the sitting area of the seat base 102 comprises a first seating portion 510 and a second seating portion 508. As indicated in FIGS. 17 to 20, the seat base 102 may comprise a supporting surface 400, which is arranged opposite to the seating surface of the sitting area of the seat base 102.

As further indicated in the FIGS. 17 to 19, the child safety seat 100 is transferable between the highback booster configuration (see FIG. 17) and the backless booster configuration (see FIG. 19) by a rotation of the seat back 104 relative to the seat base 102 (indicated by the arrow, see FIG. 18). The child safety seat 100 may comprise lap belt guides 200 (only one lap belt guide is shown) arranged on the left and right sides of the seat. The lap belt guides 200 have the purpose of guiding a lap belt portion of a three-point seatbelt in such a manner that the lap belt portion is securing the lower part of the torso of a child to the seat. As indicated in FIG. 17 and FIG. 19, the lap belt guides 200 may guide a lap belt portion of a three-point seatbelt both in the highback booster configuration (see FIG. 17) and in the backless booster configuration (see FIG. 19).

The child safety seat 100 comprises coupling means in order to support the transfer of the rotation of the seat back 104 occurring during the transfer between the backless booster configuration and the highback booster configuration into a translational displacement of the first seating portion 510. The first seating portion 510 and/or the second seating portion 508 may be movably disposable relative to the supporting surface 400 by means of an elastic element, e.g. a spring mechanism 160. The spring mechanism 160 may, as indicated in the FIG. 17-19, be adapted to spring-support the translational displacement of the first seating portion 510 and/or the transfer of the seat extension 302.

It has to be noted that the elastic element may e.g. comprise anyone of a tension/extension spring, compression spring, torsion spring, gas spring, rubber band, helical spring, coil spring etc. In the following it is assumed without restriction to generality, that the elastic element is a helical spring.

In the order of the FIGS. 17 to 19 it is shown how the child safety seat 100 may be transferred from the highback booster configuration to the backless booster configuration. Of course, the skilled person can also determine from the figures, in reverse order, how the child safety seat 100 may be transferred from the backless booster configuration to the highback booster configuration.

As shown in FIGS. 17 to 19, the coupling means may comprise a first coupling portion 150, which is rotatably mounted via a bearing 151 to the seat back 104.

The bearing 151 may be arranged at a distance from a joint 802 rotatably connecting the seat base 102 and the seat back 104 in order to provide leverage between the seat back and the first coupling portion 150. The first coupling portion 150 may comprise a slide guide 152 in which a pin 153, which is arranged on the first seating portion 510, may be guided. As indicated in FIG. 17 the slide guide may be arranged in the first coupling portion 150 in such a way that it may be essentially horizontally arranged in the highback booster configuration and as indicated in FIG. 19 may be essentially vertically arranged in the highback booster configuration. As indicated in FIGS. 17 to 19, by the rotation of the seat back 104 relative to the seat base 102 from the highback booster configuration to the backless booster configuration (see FIG. 18, arrow 183) the first coupling portion 150 with the slide guide 152 may be moved on a circular path around the joint 802 with the rotation of the seat back 104, while the pin 153 arranged on the first seating portion 510 and guided by the slide guide 152 of the on a circular path moved coupling portion 150, may be moved towards the joint 802. Further, the first seating portion 150 may thus be moved towards the joint 802 (in the direction indicated by the arrow 182). As further indicated in FIGS. 17 to 19 it may further be provided that the first coupling portion 150 may have a first stop 152, which may be a recess, and the seat back 104 may have a second stop counterpart, which may be a laterally protruding part of the joint 802, an end portion of a seat back or a further pin arranged on the seat back, to the first stop 152. As indicated in FIG. 18, the first and the second stop may, resulting from the rotation of the seat back, form a mutual contact and may engage or interlock. Thus, the seat back 104 and the first coupling element 150 may form a lever in the state of contact between the first stop (here the recess 154 of the first coupling element 150) and second stop (here the e.g. lower end portion of the seat back on the second side 108 of the seat back), wherein the bearing point 151 may form the fulcrum of the lever to rotate the first coupling element 150 together with the seat back 104 upon rotation of the seat back 104 from the highback booster configuration into the backless booster configuration.

Further, as shown in FIG. 21, the coupling means may comprise a second coupling portion 170, which is adapted to perform the transferring of the seat extension 302 between the retracted position and the at least one extended position. As indicated, the second coupling portion 170 may be coupled to the first seating portion 510. However, the second coupling portion 170 may instead or in addition be coupled to the first coupling portion 150. The second coupling portion 170 may be coupled to the first seating portion 510 and/or the first coupling portion 150 such that if the first seating portion 510 is translational displaced during the transfer between the backless booster configuration and the highback booster configuration the seat extension comprising the second seating portion 508 is transferred between the retracted position and the at least one extended position. Thus, as the seat extension is coupled via the second coupling means 170 with first seating portion 510 and/or the first coupling portion 150, it may be made possible that the seat extension may not have to be manually brought into the retracted position or the at least one extended position.

The coupling means, as indicated in FIGS. 17 to 19, are adapted to transfer the rotation of the seat back 104 around the joint 802, occurring during the transfer between the backless booster configuration and the highback booster configuration, into a translational displacement of the first seating portion 510.

As shown in FIG. 17, in the highback booster configuration, the first seating portion 510 is displaced in the direction (see arrow 181) to the front of the child safety seat 100, i.e. beyond the supporting surface 400. The first seating portion 510 may be maintained in its position in the highback booster configuration by the force of the spring mechanism 160, as the force of the spring mechanism 160 may act in the direction (see arrow 181) of the translational displacement of the first seating portion 510 occurring during the transfer from the backless booster configuration to the highback booster configuration. Thus, as indicated in FIG. 17, a spring may be supported on a vertical projection of the supporting surface 400 and may push (in the direction of arrow 181) against a portion of the first seating portion 510.

As shown in FIG. 18, a position between the highback booster configuration and the backless booster configuration, the first seating portion 510 may be moved (in the direction of arrow 182) by the first coupling portion 150 against the force of the spring mechanism 160.

As shown in FIG. 19, in the highback booster configuration, the first seating portion 510 is displaced in the direction (in the direction of arrow 182) of the rear of the child safety seat 100, i.e. situated above the supporting surface 400.

The coupling means are further adapted to transfer the seat extension 302 between the retracted position in the backless booster configuration and the extended position in the highback booster configuration. As indicated in FIGS. 20 and 21, in the extended position the second seating portion 508 extends between the first seating portion 510 and the second side 108 of the seat back 104. A stretchy textile cover (not shown) may be used that covers the seating surface and thus covers the coupling area of the first seating portion 510 and the second seating portion 508 when the seat extension is in the extended position and the child safety seat 100 is in the highback booster configuration.

LIST OF REFERENCE NUMERALS 100 child safety seat
102 seat base
104 seat back
106 surface/first side of the seat back
108 backrest/second side of the seat back
110 surface
112 child
114 sitting area
150 first coupling portion
151 bearing
152 slide guide
153 pin
154 first stop of first coupling portion
160 elastic mechanism
170 second coupling portion
181 direction
182 direction
183 direction
200 lap belt guide
202 safety belt clip
204 side wing
206 recess
210 direction
212 direction
214 direction
300 headrest
302 seat extension
400 supporting surface
402 side surface
404 narrowing section
500 connecting mechanism
504 handle
506 protrusion
508 second seating portion
510 first seating portion
600 axis
602 latching point
700 shoulder belt guide
702 upper part of the seat back
704 lower part of the seat back
706 elastic element
708 front side of the side wing
800 latching mechanism
802 joint
804 space
900 guiding element
902 positioning component
904 fixation means
906 fixation means 908 stiffening component
1000 anchor element
1001 guide rail
1002 axis
1004 first rail
1006 second rail
1100 latching elements
1300 hook
1302 side region
1400 rib
1410 cupholder
1412 axis
1500 space
1600 toothed rack
1602 locking pin

The invention claimed is:

1. Child safety seat comprising a seat base and a seat back, the child safety seat being convertible between a backless booster configuration and a highback booster configuration, in the backless booster configuration a first side of the seat back providing the sitting area of the seat and a second side of the seat back facing the seat base, the first side facing opposite the second side, and in the highback booster configuration the seat base providing the sitting area of the seat and the second side of the seat back providing a back rest of the seat; and
the seat back comprising side wings moveable between a retracted position and an extended position, wherein for each side wing in the retracted position a portion of the side wing is laterally spaced from the seat back by a gap, wherein the lap belt guide protrudes through the gap beyond the first side of the seat back in the backless booster configuration.

2. The child safety seat of claim 1, further comprising a lap belt guide, both in the backless booster configuration and the highback booster configuration, the lap belt guide protruding beyond the seating surface of the respective sitting area.

3. The child safety seat of claim 1, the seating surface forming the sitting area of the seat base comprising a first seating portion and a second seating portion, the seat base further comprising a seat extension comprising the second seating portion, the seat extension being transferable between a retracted position and at least one extended position, the seating surface of the seat base being larger in the extended position than in the retracted position.

4. The child safety seat of claim 3, the seat extension being transferable between the retracted position and the extended position by partially pulling the first seating portion and the second seating portion by a translational motion apart from each other, wherein the first seating portion and the second seating portion comprise comb-shaped interlocking ribs, the translational motion comprising moving the ribs apart from each other.

5. The child safety seat of claim 3, the seat extension being transferable between the retracted position and the extended position by a rotation around a seat extension axis, the seat extension axis being located in the seat base, the seat extension being eccentrically mounted on the seat extension axis, wherein the seat base is comprising a supporting surface opposite to the seating surface of the sitting area of the seat base, the seat extension axis being spaced apart from the supporting surface at a distance smaller than one third of the distance between the supporting surface and the seating surface of the seat base.

6. The child safety seat of claim 5, the seat back being adapted for extending from a rear section of the seat base in the highback booster configuration, the seat extension being located in a front section of the seat base, wherein in the backless booster configuration the width of the seat base narrows towards the front section of the seat base within a narrowing section of the seat base, the seat extension axis being located in the narrowing section.

7. The child safety seat of claim 3, the seat base comprising a supporting surface opposite to the seating surface of the sitting area of the seat base, in the retracted position of the seat extension the second portion being partially received in between the first portion and the supporting surface.

8. The child safety seat of claim 3, the child safety seat being transferable between the backless booster configuration and the highback booster configuration by a rotation of the seat back relative to the seat base, the child safety seat further comprising coupling means, the coupling means being adapted to transfer the rotation of the seat back occurring during the transfer between the backless booster configuration and the highback booster configuration into a translational displacement of the first seating portion and to transfer the seat extension between the retracted position in the backless booster configuration and the extended position in the highback booster configuration, wherein in the extended position the second seating portion extends between the first seating portion and the second side of the seat back.

9. The child safety seat of claim 8, wherein the coupling means comprises a first coupling portion rotatably mounted via a bearing to the seat back, the first coupling portion comprising a slide guide in which a pin arranged on the first seating portion is guided.

10. The child safety seat of claim 8, the seat base comprising a supporting surface opposite to the seating surface of the sitting area of the seat base, wherein the first seating portion or the second seating portion are movably disposable relative to the supporting surface by means of an elastic element, the elastic element being optionally adapted to elastically support the translational displacement of the first seating portion and/or the transfer of the seat extension.

11. The child safety seat of claim 10, wherein in the highback booster configuration the first seating portion is maintained in its position by the force of the elastic element.

12. The child safety seat of claim 10, wherein the force of the elastic element is acting in the direction of the translational displacement of the first seating portion occurring during the transfer from the backless booster configuration to the highback booster configuration, wherein the force is acting in between the first seating portion and the supporting surface in the direction of the translational displacement during the transfer from the backless booster configuration to the highback booster configuration.

13. The child safety seat of any of claims 9,
the first coupling portion being adapted for being rotated around the bearing, and
the slide guide being adapted for pulling the pin towards the bearing when the seat back is rotated relative to seat base from the highback booster configuration to the backless booster configuration.

14. The child safety seat of claims 9, the first coupling portion having a first stop and the seat back having a second stop counterpart to the first stop, the first and the second stop being adapted due to a mutual contact to rotate the first coupling element together with the seat back upon rotation of the seat back from the highback booster configuration into the backless booster configuration, the mutual contact resulting from said rotation of the seat back.

15. The child safety seat of claim 14, wherein in the state of contact between the first and second stop the seat back and the first coupling element form a lever, the bearing point forming the fulcrum of the lever.

16. The child safety seat of claim 14, the coupling means comprising a second coupling portion, the second coupling portion being adapted to perform the transferring of the seat extension between the retracted position and the at least one extended position, the second coupling portion being coupled to the first seating portion or the first coupling portion.

17. The child safety seat of claim 16, the transferring of the seat extension comprising a rotation of the seat extension around a rotation point of the seat back or of an element rigidly connected to the supporting surface.

18. The child safety seat of claim 1, wherein for each side wing in the extended position of the side wing a spacing between the back rest and the side wing in a plane orthogonal to a plane defined by the back rest is larger than in the retracted position of the side wing, wherein for each side wing in the extended position of the side wing the spacing between the seating surface of the sitting area of the seat base and the side wing in a plane parallel to the plane defined by the back rest is smaller than in the retracted position of the side wing; the child safety seat further comprising one or more elastic elements, the side wings being moveable from their retracted position to their extended position by the one or more elastic elements.

19. The child safety seat of claim 18, the child safety seat further comprising a shoulder belt guide having a side facing away from the seating space confined by the side wings, wherein in the retracted position of the side wings the side of the shoulder belt guide facing away from the seating space is laterally covered by one of the side wings at least partially, wherein in the retracted position of the side wings the shoulder belt guide is at least partially received in one of the side wings or the seat back.

20. The child safety seat of claim 1, the seat back being adapted for extending from a rear section of the seat base in the highback booster configuration, the seat back comprising a headrest moveable between at least one extended position and a retracted position, wherein in the extended position of the headrest the vertical spacing between the seating surface of the sitting area of the seat base and the headrest is larger than in the retracted position, the movability of the side wings between their extended and retracted position being independent from the movability of the headrest between its extended and retracted position, the side wings being movably mounted to the headrest, wherein a bottom side of the headrest is adapted for facing the seating surface of the sitting area of the seat base in the highback booster configuration, wherein in the backless booster configuration the bottom side of the headrest is resting on part of a front side surface of the seat base, wherein the bottom side of the headrest is adapted for resting on part of the seat extension in the retracted position of the headrest in the backless booster configuration.

21. The child safety seat of claim 20, further comprising fixation means and a control element for controlling the fixation means for a fixation of the headrest in the at least one extended position and the retracted position of the headrest, respectively.

22. The child safety seat of claim 1, further comprising a safety belt clip, the safety belt clip comprising a positioning component and a guiding element, the positioning component being coupled to the seat base and the guiding element being adapted to engage with a lap portion of a safety belt, the seat base comprising a storage space below the seating surface forming the sitting area of the seat base, the storage space being adapted for completely receiving the safety belt clip in the backless booster configuration, the positioning component being adapted to position the guiding element at a predefined distance from the seating surface of the sitting area in the highback booster configuration, the guiding element being adapted for limiting a movability of the lap portion of the safety belt in a direction vertical to the respective seating surface of the sitting area.

23. The child safety seat of claim 1, further comprising a safety belt clip, the safety belt clip comprising a positioning component and a guiding element, the positioning component being coupled to the seat base and the guiding element being adapted to engage with a lap portion of a safety belt, the positioning component being adapted to position the guiding element at a first distance from the seating surface of the sitting area in the backless booster configuration and to position the guiding element at a second distance from the seating surface of the sitting area in the highback booster configuration, the seat back comprising a recess, the positioning component being adapted for protruding in the backless booster configuration through the recess beyond the seating surface of the sitting area provided by the seat back, the guiding element being adapted for limiting a movability of the lap portion of the safety belt in a direction vertical to the respective seating surface of the sitting area, the positioning component being adjustable in length such that the first distance is generally the same as the second distance, wherein the seat base comprises a supporting surface opposite to the seating surface of the sitting area of the seat base, the positioning component comprising a ribbon being passed through an opening in the seat base to the supporting surface, the supporting surface comprising a first fixation means for fixing the ribbon to the seat base in the backless booster configuration and a second fixation means for fixing the ribbon to the seat base in the highback booster configuration, wherein the location of the first and second fixation means is selected such that the guiding element is positioned at the first distance in the backless booster configuration and at the second distance in the highback booster configuration.

24. The child safety seat of claim 1, the seat base further comprising a connecting mechanism, the connecting mechanism comprising
- an anchor element adapted for detachably anchoring the seat base to a vehicle in a functioning position of the anchor element, and
- a guide rail, the anchor element being pivoted to the guide rail such that the anchor element can be pivoted between the functioning position and a resting position, wherein in the resting position the anchor element is received in the guide rail, the guide rail being adjustable in length, the seat base being adapted to completely receive the anchor element in the resting position, the guide rail being a telescopic rail.

25. The child safety seat of claim 24, the telescopic rail comprising a first and a second rail engaging each other, the first rail being fixed to the seat base and the anchor element being pivoted to the second rail, the second rail comprising a handle, the handle and the first rail comprising multiple opposing latching elements, wherein the anchor element is pivoted to the guide rail by an axis, the latching points of the latching elements being arranged in a plane parallel to said axis.

26. The child safety seat of claim 25, the handle comprising a rotation knob, a rotation axis of the rotation knob is coaxial or parallel to the rotation axis pivoting the anchor element to the second rail, wherein the rotation knob is adapted upon rotation around the axis for engaging and disengaging the opposing latching elements.

\* \* \* \* \*